United States Patent
Milyakov

(10) Patent No.: US 9,667,681 B1
(45) Date of Patent: May 30, 2017

(54) SYSTEMS AND METHODS FOR PROVIDING MESSAGES TO MULTIPLE SUBSCRIBERS

(71) Applicant: Machine Zone, Inc., Palo Alto, CA (US)

(72) Inventor: Igor Milyakov, Sunnyvale, CA (US)

(73) Assignee: Machine Zone, Inc., Palo Alto, CA (US)

( * ) Notice: Subject to any disclaimer, the term of this patent is extended or adjusted under 35 U.S.C. 154(b) by 0 days.

(21) Appl. No.: 15/274,281

(22) Filed: Sep. 23, 2016

(51) Int. Cl.
 *H04L 29/06* (2006.01)
 *H04L 29/08* (2006.01)

(52) U.S. Cl.
 CPC ...... *H04L 65/4076* (2013.01); *H04L 67/2842* (2013.01); *H04L 69/16* (2013.01)

(58) Field of Classification Search
 None
 See application file for complete search history.

(56) References Cited

U.S. PATENT DOCUMENTS

| | | | |
|---|---|---|---|
| 4,264,924 A | 4/1981 | Freeman | |
| 5,706,331 A | 1/1998 | Wang et al. | |
| 5,878,228 A | 3/1999 | Miller et al. | |
| 6,208,691 B1 | 3/2001 | Balakrishnan et al. | |
| 6,549,959 B1 | 4/2003 | Yates et al. | |
| 7,047,394 B1 | 5/2006 | Van Dyke et al. | |
| 7,065,633 B1 | 6/2006 | Yates, Jr. et al. | |
| 7,376,092 B2 | 5/2008 | Yajnik et al. | |
| 7,613,813 B2 | 11/2009 | Hussain et al. | |
| 7,668,908 B2 | 2/2010 | Kakivaya et al. | |
| 7,676,580 B2 | 3/2010 | Hill et al. | |
| 7,774,720 B1 | 8/2010 | Demetriades et al. | |
| 7,929,562 B2 | 4/2011 | Petrovykh | |
| 7,941,448 B2 | 5/2011 | Eslambolchi et al. | |
| 7,970,828 B2 | 6/2011 | Carmeli et al. | |
| 7,970,918 B2 | 6/2011 | Thompson et al. | |
| 8,065,504 B2 | 11/2011 | Yates, Jr. et al. | |
| 8,074,055 B1 | 12/2011 | Yates, Jr. et al. | |
| 8,086,672 B2 | 12/2011 | Horvitz | |

(Continued)

OTHER PUBLICATIONS

Bustamante, F., "The Active Streams Approach to Adaptive Distributed Applications and Services," Thesis, Georgia Institute of Technology; 112pgs.; Nov. 2001.

(Continued)

*Primary Examiner* — Angela Nguyen
(74) *Attorney, Agent, or Firm* — Goodwin Procter LLP

(57) ABSTRACT

Methods, systems, and apparatus, including computer programs encoded on a computer storage device, for: receiving messages from a plurality of publishers; assigning each of the messages to one of a plurality of channels, wherein each channel comprises an ordered plurality of messages; storing messages of each of the channels in respective storage buffers according to the order, wherein each storage buffer comprises a respective time-to-live of a first time duration; for a particular channel, retrieving messages of the particular channel from respective storage buffers; storing the retrieved messages of the particular channel in a delivery buffer, the delivery buffer comprising data blocks, wherein each data block comprises a respective time-to-live of a second time duration; and providing the messages stored in the delivery buffer to a plurality of subscribers of the particular channel.

20 Claims, 10 Drawing Sheets

(56) References Cited

U.S. PATENT DOCUMENTS

| | | | |
|---|---|---|---|
| 8,121,828 | B2 | 2/2012 | Yates, Jr. et al. |
| 8,375,095 | B2 | 2/2013 | Yurkovich et al. |
| 8,392,555 | B2 | 3/2013 | Gale et al. |
| 8,429,702 | B2 | 4/2013 | Yasrebi et al. |
| 8,441,965 | B2 | 5/2013 | Jazra |
| 8,489,674 | B2 | 7/2013 | Srivastava et al. |
| 8,539,359 | B2 | 9/2013 | Rapaport et al. |
| 8,799,213 | B2 | 8/2014 | Wong et al. |
| 8,850,015 | B2 | 9/2014 | Finn |
| 8,856,202 | B2 | 10/2014 | McCabe et al. |
| 8,886,731 | B2 | 11/2014 | Gunawardena et al. |
| 8,898,293 | B2 | 11/2014 | Raleigh et al. |
| 8,965,409 | B2 | 2/2015 | Abhyanker |
| 9,215,261 | B2 | 12/2015 | Marcus |
| 9,270,944 | B2 | 2/2016 | Brooks et al. |
| 9,319,363 | B1 | 4/2016 | Walkin et al. |
| 2002/0016851 | A1 | 2/2002 | Border |
| 2004/0073641 | A1* | 4/2004 | Minhazuddin .......... H04L 29/06 709/223 |
| 2004/0083264 | A1 | 4/2004 | Veselov |
| 2004/0139166 | A1 | 7/2004 | Collison |
| 2004/0139309 | A1 | 7/2004 | Gentil et al. |
| 2004/0167932 | A1 | 8/2004 | Edmonds |
| 2005/0021622 | A1 | 1/2005 | Cullen |
| 2005/0047396 | A1* | 3/2005 | Helm ...................... H04L 47/10 370/352 |
| 2005/0171799 | A1 | 8/2005 | Hull et al. |
| 2005/0262205 | A1 | 11/2005 | Nikolov et al. |
| 2006/0036679 | A1 | 2/2006 | Goodman et al. |
| 2006/0149787 | A1 | 7/2006 | Surlaker et al. |
| 2007/0013948 | A1 | 1/2007 | Bevan |
| 2007/0028173 | A1 | 2/2007 | Lauder |
| 2008/0016198 | A1 | 1/2008 | Johnston-Watt et al. |
| 2008/0186973 | A1* | 8/2008 | Shihara ............... H04L 12/4625 370/394 |
| 2008/0235366 | A1 | 9/2008 | Telfer |
| 2009/0037514 | A1 | 2/2009 | Lankford et al. |
| 2009/0157795 | A1 | 6/2009 | Black |
| 2009/0222348 | A1 | 9/2009 | Ransom et al. |
| 2010/0251262 | A1 | 9/2010 | Rokicki et al. |
| 2011/0179162 | A1 | 7/2011 | Mayo |
| 2012/0023116 | A1 | 1/2012 | Wilkes et al. |
| 2012/0150960 | A1 | 6/2012 | Nalawade |
| 2012/0197990 | A1 | 8/2012 | Li et al. |
| 2012/0278728 | A1 | 11/2012 | Malin et al. |
| 2012/0284756 | A1 | 11/2012 | Kotecha et al. |
| 2013/0031162 | A1 | 1/2013 | Willis et al. |
| 2013/0066967 | A1 | 3/2013 | Alexander |
| 2013/0067114 | A1 | 3/2013 | Hjelm et al. |
| 2013/0081060 | A1 | 3/2013 | Otenko |
| 2013/0159472 | A1 | 6/2013 | Newton et al. |
| 2013/0212491 | A1 | 8/2013 | Yerli |
| 2013/0254314 | A1 | 9/2013 | Chow |
| 2013/0290449 | A1 | 10/2013 | Norby et al. |
| 2013/0340097 | A1 | 12/2013 | Gowel |
| 2014/0082085 | A1 | 3/2014 | Krishnaprasad et al. |
| 2014/0114738 | A1 | 4/2014 | Tseng et al. |
| 2014/0226713 | A1 | 8/2014 | Perlman et al. |
| 2014/0237057 | A1 | 8/2014 | Khodorenko |
| 2014/0310369 | A1 | 10/2014 | Makhervaks et al. |
| 2014/0372489 | A1 | 12/2014 | Jaiswal et al. |
| 2014/0372755 | A1 | 12/2014 | Ristock et al. |
| 2015/0012598 | A1 | 1/2015 | Klimt |
| 2015/0100664 | A1 | 4/2015 | Flack et al. |
| 2015/0207851 | A1 | 7/2015 | Nampally |
| 2015/0262151 | A1 | 9/2015 | Enzminger et al. |
| 2015/0317676 | A1 | 11/2015 | Reid et al. |
| 2015/0365358 | A1 | 12/2015 | Strassner |
| 2015/0379160 | A1 | 12/2015 | Avraham et al. |
| 2016/0072865 | A1 | 3/2016 | Kaplinger et al. |
| 2016/0261480 | A1 | 9/2016 | Agarwal et al. |
| 2016/0285986 | A1 | 9/2016 | Mokhtari et al. |

OTHER PUBLICATIONS

Cagle, K., "Convert a Text File to XML," accessed on the internet at http://www.devx.com/getHelpOn/10MinuteSolution/20356; downloaded Sep. 22, 2016; 8pgs.

Chakravarthy, S. and Vontella, N., "A Publish / Subscribe Based Architecture of an Alert Server to Support Prioritized and Persistent Alerts," Lecture Notes in Computer Science; 3347:1-6-116; Jan. 2004.

Cilia, M., et al., "Looking into the Past: Enhancing Mobile Publish/Subscribe Middleware," Proceedings of the 2nd Int'l Workshop on Distributed Event-based Systems (DEBS '03); pp. 1-8; Jun. 2003.

Corsaro, A., et al., "Quality of Service in Publish/Subscribe Middleware," IOS Press; pp. 1-19; 2003.

Int'l Search Report and Written Opinion of the ISA/EP in PCT/US2016/022316; Jun. 1, 2016; 11pgs.

Int'l Search Report and Written Opinion of the ISA/EP in PCT/US2016/023164; Jul. 11, 2016; 15pgs.

Int'l Search Report and Written Opinion of the ISA/EP in PCT/US2016/039958; Oct. 4, 2016; 11pgs.

King, A., et al., "Load Balancing Content-Based Publish/Subscribe Systems," ACM Transactions on Computer Systems; 28(4):9:1-9:55; Dec. 2010.

Phanishayee, A., "Chaining for Flexible and High-Performance Key-Value Systems," Doctoral Dissertation, Carnegie Mellon University, School of Computer Science; 148pgs.; Sep. 2012.

Vahdat, A. and Becker, D., "Epidemic Routing for Partially-Connected Ad Hoc Networks," Duke University; 14pgs.; Jul. 2000.

Zeidler, et al., "Mobility Support with Rebeca," Proc. 23rd Int'l Conference on Distributed Computing Systems Workshops; May 19-22, 2003; 7pgs.

"Cloud Pub/Sub," accessed on the internet at: https://cloud.google.com/pubsub/overview; downloaded Aug. 7, 2015; 5pgs.

"Publish—subscribe pattern"; accessed on the internet at: https://en.wikipedia.org/wiki/Publish%E2%80%93subscribe_pattern; downloaded Aug. 7, 2015; 4pgs.

"Welcome to PyPubSub's Home Page!," accessed on the internet at: http://pubsub.sourceforge.net/; downloaded Aug. 7, 2015; 2pgs.

* cited by examiner

SYSTEMS AND METHODS FOR PROVIDING MESSAGES TO MULTIPLE SUBSCRIBERS

BACKGROUND

This specification relates to a data communication system and, in particular, a system that implements real-time, scalable publish-subscribe messaging.

The publish-subscribe pattern (or "PubSub") is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Some PubSub systems do not cache messages or have small caches meaning that subscribers may not receive messages that were published before the time of subscription to a particular topic. PubSub systems can be susceptible to performance instability during surges of message publications or as the number of subscribers to a particular topic increases.

SUMMARY

In various implementations, the systems and methods described herein utilize a shared structure (i.e., a "fast buffer") to store message data that can be read by multiple subscribers simultaneously. To avoid issues associated with locking, the systems and methods utilize a "lock-free" or non-blocking approach. Subscribers are able to grab many pieces of data without blocking or figuring out where to read from and up to which point in the fast buffer.

The systems and methods provide many benefits compared to prior approaches. For example, publishers are not limited by subscribers or associated subscription logic and have a stable publishing speed, regardless of how many subscribers exist, if any. This property of the system can be achieved, for example, by making publishing and subscribing components and/or processes independent from each other. In some instances, the publishing and subscribing components can share information through lock-free memory writes and reads, for example, using the fast buffer approach described herein. Alternatively or additionally, publishing and subscribing components and/or processes can be configured to utilize different physical cores, such that, for example, publishing and subscribing components interact solely through a memory controller and bus, which is typically fast and/or does not present a bottleneck.

Alternatively or additionally, system flexibility allows publishers to be prioritized (or deprioritized) over subscribers, if desired. In preferred examples, the fast buffer has or utilizes loosely coupled publishing and subscribing loops. This allows a publishing speed to be different from a subscribing speed, if desired, and/or for each speed to be chosen or prioritized, for example, according system load. When publishing activity is high and/or it is preferable to not limit the publishing activity, for example, the publishing loop can be prioritized over the subscribing loop. To achieve such prioritization, the publishing loop can be made to spin as if there were no subscribers (e.g., the publishing loop can be processed faster than the subscribing loop is processed). In other words, it can be desirable to not block or limit publishers by allowing the system to pass as much published message data as possible, even if subscribers are unable to keep up with or receive all of the message data. Alternatively or additionally, when subscribing activity is high, it can be desirable to not block or limit subscribers and/or to apply automatic back-pressure on publishers, such that publishing activity is reduced. Such prioritization can be achieved, for example, by creating two worker pools (e.g., one pool for publishers and one pool for subscribers) and using an operating system kernel scheduler prioritization mechanism to set different priorities to threads in the two pools. Other approaches for prioritizing or deprioritzing publishers and subscribers are contemplated.

A further advantage of the systems and methods is that subscribers can utilize data aggregation and can define how much data to aggregate. In general, use of data aggregation and/or aggregation size optimization can help achieve better performance characteristics and/or reduce memory usage. For example, when delivering messages, the messages can be grouped into blocks or batches (e.g., a comma-separated list of messages in the fast buffer). When preparing message data to be sent, the systems and methods can decide how many messages to aggregate for the next block. The sizes of packets exchanged in a connection can depend on connection properties (e.g., bandwidth and/or latency) and/or on a state of a TCP connection. In some instances, this allows the process of collecting messages for the connection to aggregate more messages in a block to produce a bigger packet, thereby better utilizing network capacity and providing higher throughput with less overhead.

Another benefit of the systems and methods is that, depending on message activity, subscribers can change the frequency of data reading by finding an optimal balance between performance and latency. For example, using the notifier approach described herein, channels with high message activity can be actively monitored for new messages, while channels with low message activity can receive less active monitoring. Subscribers are preferably isolated and do not affect one other. If one subscriber is slower than a message stream, other subscribers are generally unaffected by the slow subscriber and can keep up with the message stream.

A further benefit of the systems and methods is that modularity is increased, which allows system components to be implemented independently. Interaction is preferably done through memory, so subscribers can be placed on separate individual processes to access the fast buffer. In alternative approaches, multiple logical parts of a system can be coupled tightly to reduce interface overhead (e.g., preparing data to be exported and parsing on input) and/or to make changes more granular and precise. The drawback of such approaches is reduced isolation, reduced reliability and, in general, less efficiency (e.g., due to load of one component influencing other components). The opposite approach, used in examples of the systems and methods described herein, is to isolate components from each other and to achieve increased reliability and efficiency and better management and prioritization of system components. In general, isolation is more effective when the cost of overhead is low or at least acceptable. In the systems and methods, for example, the cost of overhead is generally low because processes can communicate by writing to and reading from the fast buffer. The systems and methods can benefit from such modularity with little or no added cost. In some implementations, when shared memory at the operating system level is used, publishers and subscribers can be implemented in different processes and/or can start using implementations written in different languages. In general, interaction through use of the fast buffer limits communication to only two operations: writing to the memory and reading from the memory. The use of messages, signals, locks, and/or synchronization primitives can be avoided. As discussed herein, test results indicate that the systems and methods greatly improve message transfer rates from publishers to subscribers.

In general, one aspect of the subject matter described in this specification can be embodied in computer-implemented methods that include the actions of: receiving a plurality of messages from a plurality of publishers; assigning each of the messages to one of a plurality of channels, wherein each channel includes an ordered plurality of messages; storing messages of each of the channels in one or more respective storage buffers according to the order, wherein each storage buffer includes a respective time-to-live (TTL) of a first time duration; for a particular channel, retrieving messages of the particular channel from respective storage buffers (e.g., those having times-to-live that have not expired and according to the order); storing the retrieved messages of the particular channel in a delivery buffer according to the order, the delivery buffer including one or more data blocks, wherein each data block includes a respective time-to-live of a second time duration (e.g., that is longer than the first time duration); and providing the messages stored in the delivery buffer to a plurality of subscribers of the particular channel. Other embodiments of this aspect include corresponding systems, apparatus, storage devices, and computer programs.

These and other aspects can optionally include one or more of the following features. Providing the messages stored in the delivery buffer to the plurality of subscribers of the particular channel can further include determining a connection status of a particular subscriber and, based thereon, providing one or more of the messages stored in the delivery buffer to the particular subscriber. The aspect can further include determining that the particular subscriber has a current connection to the particular channel, and, based thereon, providing to the particular subscriber one or more messages stored in the delivery buffer including messages stored in one or more data blocks having respective times-to-live that have expired. The aspect can further include determining that the particular subscriber does not have a current connection to the particular channel and, based thereon, (i) providing to the particular subscriber one or more messages stored in one or more of the data blocks having respective times-to-live that have not expired, and (ii) preventing the particular subscriber from receiving one or more messages stored in one or more data blocks having respective times-to-live that have expired. Storing the retrieved messages of the particular channel in the delivery buffer can include storing retrieved messages of the particular channel earlier in the order in data blocks having times-to-live that will expire sooner than data blocks used to store retrieved messages of the particular channel later in the order. The delivery buffer can include a linked list of the data blocks. Retrieved messages last in the order of the particular channel can be stored in a tail data block of the linked list. Storing the retrieved messages of the particular channel in the delivery buffer can further include removing from the linked list one or more data blocks at a head of the linked list. The removed data blocks can include respective times-to-live that have expired (e.g., for exceeding a specified time period). The delivery buffer can reside on a first computing node. The messages stored in the delivery buffer can be provided to each of the plurality of subscribers through a respective computing process residing on the first computing node. The storage buffers can reside on respective second computing nodes that are different from the first computing node. In some examples, the delivery buffer can include a visible area and an invisible area. A subscriber with a pre-existing connection (e.g., a subscriber that was previously granted read access to the delivery buffer and has been reading from the delivery buffer) may be permitted to access data from both the visible area and the invisible area. A subscriber with a new connection (e.g., a subscriber that was recently granted read access and has not yet started reading from the delivery buffer) may be permitted to access data from the visible area and not be permitted to access data from the invisible area.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
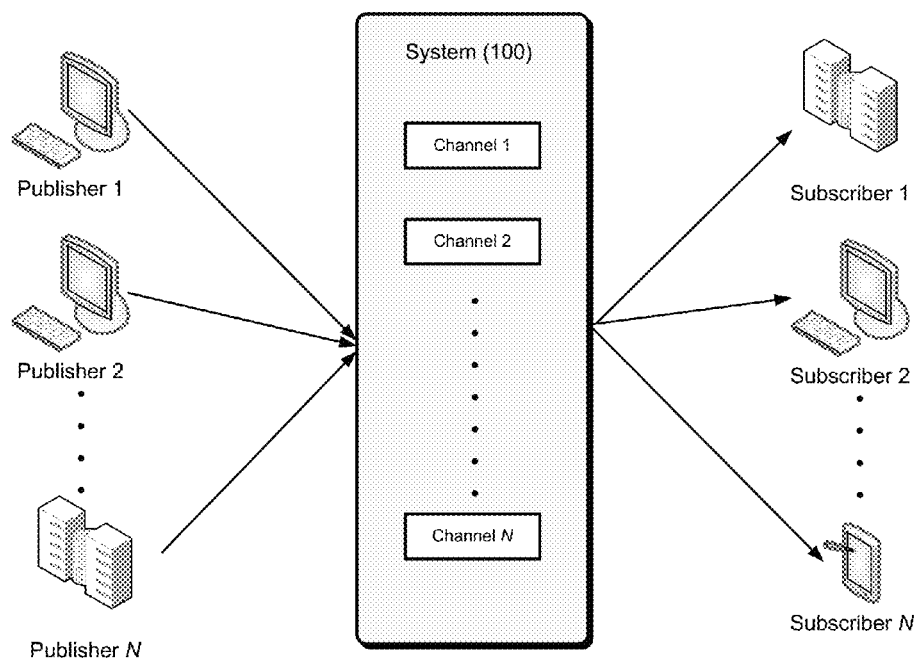
FIG. 1A illustrates an example system that supports the PubSub communication pattern.

FIG. 1A illustrates an example system 100 that supports the Pub Sub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a Pub Sub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot or other suitable separator. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
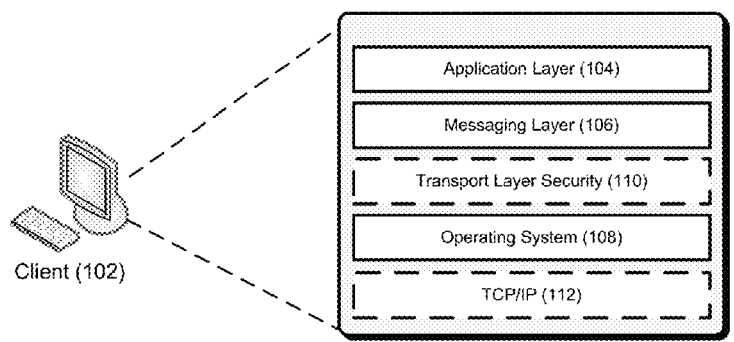
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the Pub Sub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
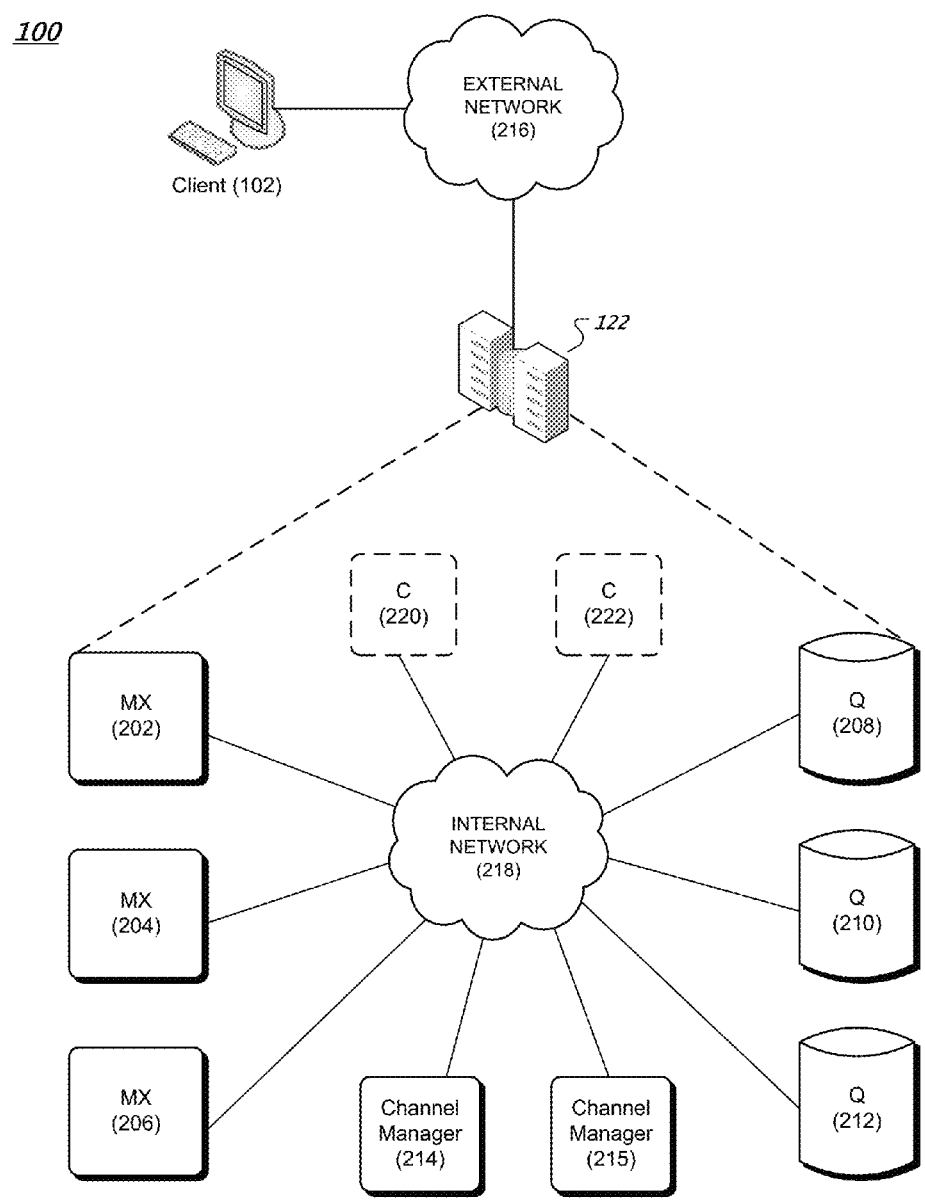
FIG. 2 is a diagram of an example messaging system.

FIG. 2 is a diagram of an example messaging system 100. The system 100 provides functionality for implementing Pub Sub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more channel manager nodes (e.g., channel managers 214, 215), and optionally one or more C nodes (e.g., C nodes or cache nodes 220 and 222). Each node can execute in a virtual machine or on a physical machine (e.g., a data processing apparatus). Each MX node serves as a termination point for one or more publisher and/or subscriber connections through the external network 216. The internal communication among MX nodes, Q nodes, C nodes, and the channel manager, is conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream, for example, by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each channel manager node is responsible for managing Q node load by splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX node 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different sizes and/or by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX node 204) makes a request to a channel manager (e.g., channel manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a channel manager to grant access to a streamlet for the channel from which messages are read. If the MX node has already been granted read access to a streamlet for the channel (and the channel's TTL has not been closed to reading) the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the channel manager that allows the MX node to store a block of data into a streamlet on a particular Q node that stores streamlets of the particular channel. Example streamlet grant request and grant data structures are as follows:

StreamletGrantRequest={
    "channel": string( )
    "mode": "read"|"write"
    "position": 0
    }
    StreamletGrantResponse={
    "streamlet-id": "abcdef82734987",
    "limit-size": 2000000, #2 megabytes max
    "limit-msgs": 5000, #5 thousand messages max
    "limit-life": 4000, # the grant is valid for 4 seconds
    "q-node": string( )
    "position": 0
    }

The StreamletGrantRequest data structure stores the name of the stream channel and a mode indicating whether the MX node intends on reading from or writing to the streamlet. The MX node sends the StreamletGrantRequest to a channel manager node. The channel manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the channel manager to read from or write to a streamlet. The new grant will reference a different streamlet and will refer to the same or a different Q node depending on where the new streamlet resides.

Figure 3A:
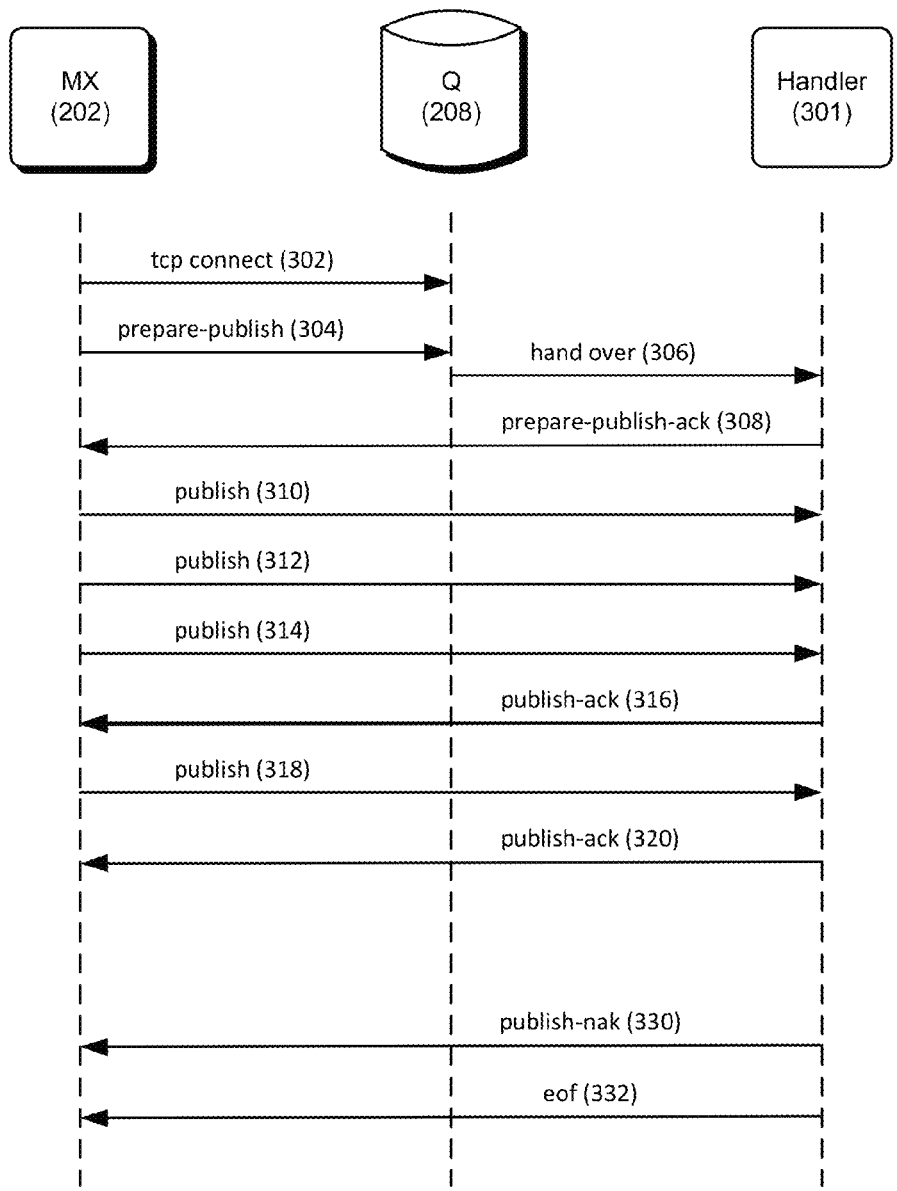
FIG. 3A is a data flow diagram of an example method for writing data to a streamlet.

FIG. 3A is a data flow diagram of an example method for writing data to a streamlet in various implementations. In FIG. 3A, when an MX node (e.g., MX node 202) request to write to a streamlet is granted by a channel manager (e.g., channel manager 214), as described before, the MX node establishes a Transmission Control Protocol (TCP) connection with the Q node (e.g., Q node 208) identified in the grant response received from the channel manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the channel manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turns stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received) or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a channel manager if the MX node has additional messages to store.

Figure 3B:
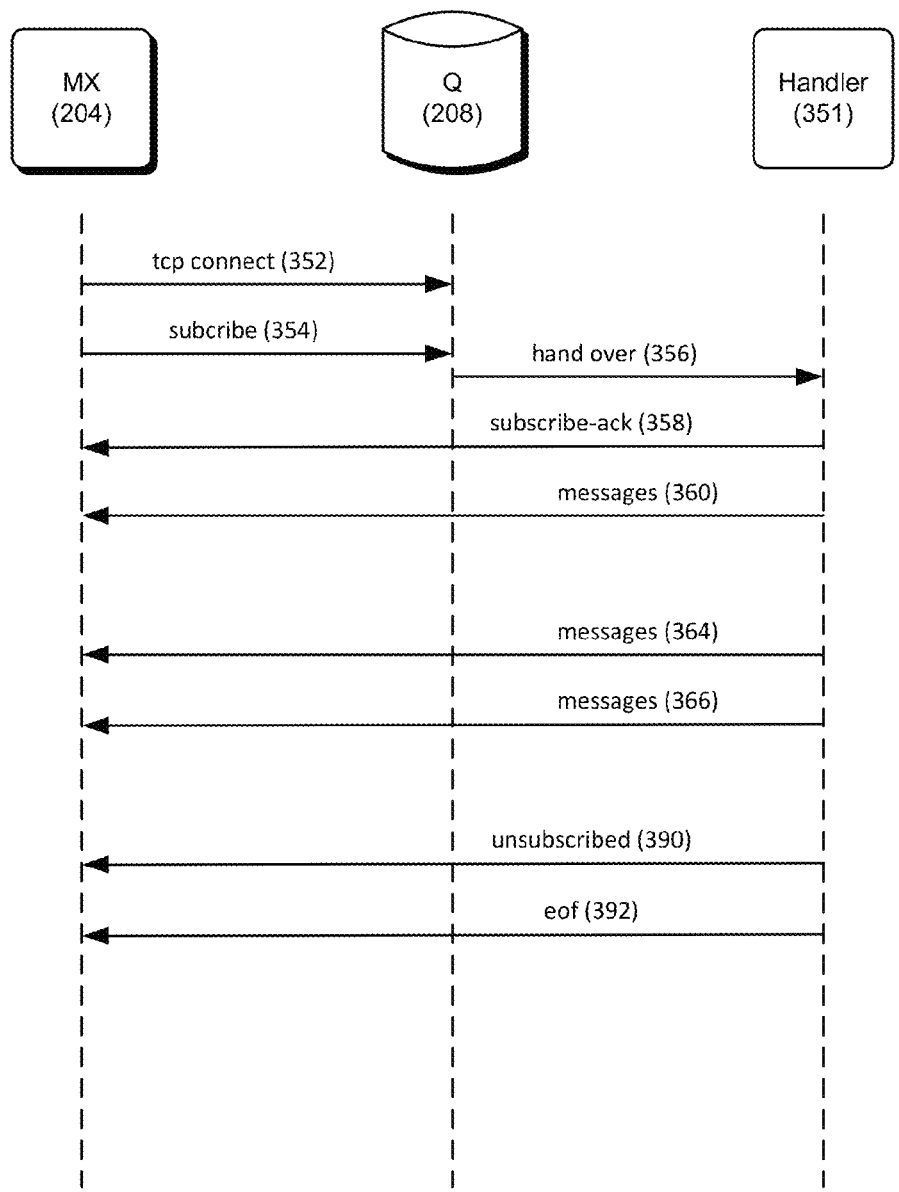
FIG. 3B is a data flow diagram of an example method for reading data from a streamlet.

FIG. 3B is a data flow diagram of an example method for reading data from a streamlet in various implementations. In FIG. 3B, an MX node (e.g., MX node 204) sends to a channel manager (e.g., channel manager 214) a request for reading a particular channel starting from a particular message or time offset in the channel. The channel manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the channel manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the channel manager). The MX node can also close the association with the handler process if the MX node receives an unsubscribe message from a corresponding client device.

In various implementations, a streamlet can be written into and read from at the same time instance. For instance, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a channel manager) can read the streamlets from the C nodes instead.

As described above, messages for a channel in the messaging system 100 are ordered in a channel stream. A channel manager (e.g., channel manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in, for example, registers and/or dynamic memory elements associated with a computing process on a Q node, thus avoiding the need to access persistent, slower storage devices such as hard disks. This results in faster message access. The channel manager can also balance load among Q nodes in the messaging system 100 by monitoring respective workloads of the Q nodes and allocating streamlets in a way that avoids overloading any one Q node.

In various implementations, a channel manager maintains a list identifying each active streamlet, the respective Q node on which the streamlet resides, an identification of the position of the first message in the streamlet, and whether the streamlet is closed for writing. In some implementations, Q nodes notify the channel manager and any MX nodes that are publishing to a streamlet that the streamlet is closed due to being full or when the streamlet's TTL has expired. When a streamlet is closed, the streamlet remains on the channel manager's list of active streamlets until the streamlet's TTL has expired so that MX nodes can continue to retrieve messages from the streamlet.

When an MX node requests a write grant for a given channel and there is not a streamlet for the channel that can be written to, the channel manager allocates a new streamlet on one of the Q nodes and returns the identity of the streamlet and the Q node in the StreamletGrantResponse. Otherwise, the channel manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the channel manager.

When an MX node requests a read grant for a given channel and there is not a streamlet for the channel that can be read from, the channel manager allocates a new streamlet on one of the Q nodes and returns the identity of the streamlet and the Q node in the StreamletGrantResponse. Otherwise, the channel manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired, the handler process 351 sends an EOF message (392) to any MX nodes that are subscribed to the streamlet.

As described earlier in reference to FIG. 2, the messaging system 100 can include multiple channel managers (e.g., channel managers 214, 215). Multiple channel managers provide resiliency and prevent single point of failure. For instance, one channel manager can replicate lists of streamlets and current grants it maintains to another "slave" channel manager. As for another example, multiple channel managers can coordinate operations between them using distributed consensus protocols, such as, for example, Paxos or Raft protocols.

Figure 4A:
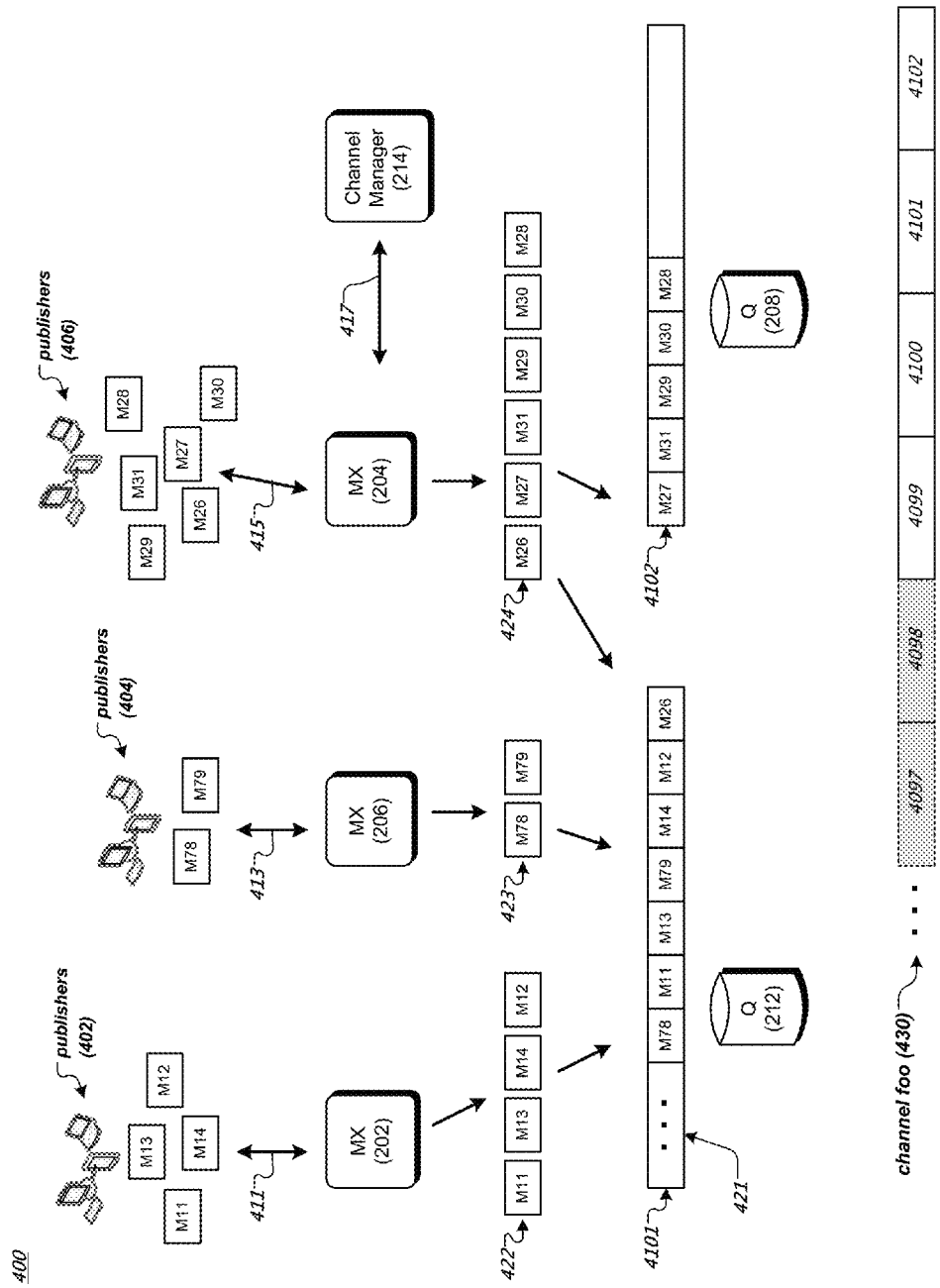
FIG. 4A is a data flow diagram of an example method for publishing messages to a channel of a messaging system.

FIG. 4A is a data flow diagram of an example method for publishing messages to a channel of a messaging system. In FIG. 4A, publishers (e.g., publisher clients 402, 404, 406) publish messages to the messaging system 100 described earlier in reference to FIG. 2. For instance, publishers 402 respectively establish connections 411 and send publish requests to the MX node 202. Publishers 404 respectively establish connections 413 and send publish requests to the MX node 206. Publishers 406 respectively establish connections 415 and send publish requests to the MX node 204. Here, the MX nodes can communicate (417) with a channel manager (e.g., channel manager 214) and one or more Q nodes (e.g., Q nodes 212 and 208) in the messaging system 100 via the internal network 218.

By way of illustration, each publish request (e.g., in JSON key/value pairs) from a publisher to an MX node includes a channel name and a message. The MX node (e.g., MX node 202) can assign the message in the publish request to a distinct channel in the messaging system 100 based on the channel name (e.g., "foo") of the publish request. The MX node can confirm the assigned channel with the channel manager 214. If the channel (specified in the subscribe request) does not yet exist in the messaging system 100, the channel manager can create and maintain a new channel in the messaging system 100. For instance, the channel manager can maintain a new channel by maintaining a list identifying each active streamlet of the channel's stream, the respective Q node on which the streamlet resides, and identification of the positions of the first and last messages in the streamlet as described earlier.

For messages of a particular channel, the MX node can store the messages in one or more buffers or streamlets in the messaging system 100. For instance, the MX node 202 receives from the publishers 402 requests to publish messages M11, M12, M13, and M14 to a channel foo. The MX node 206 receives from the publishers 404 requests to publish messages M78 and M79 to the channel foo. The MX node 204 receives from the publishers 406 requests to publish messages M26, M27, M28, M29, M30, and M31 to the channel foo.

The MX nodes can identify one or more streamlets for storing messages for the channel foo. As described earlier, each MX node can request a write grant from the channel manager 214 that allows the MX node to store the messages in a streamlet of the channel foo. For instance, the MX node 202 receives a grant from the channel manager 214 to write messages M11, M12, M13, and M14 to a streamlet 4101 on the Q node 212. The MX node 206 receives a grant from the channel manager 214 to write messages M78 and M79 to the streamlet 4101. Here, the streamlet 4101 is the last one (at the moment) of a sequence of streamlets of the channel stream 430 storing messages of the channel foo. The streamlet 4101 has messages (421) of the channel foo that were previously stored in the streamlet 4101, but is still open, i.e., the streamlet 4101 still has space for storing more messages and the streamlet's TTL has not expired.

The MX node 202 can arrange the messages for the channel foo based on the respective time that each message was received by the MX node 202, e.g., M11, M13, M14, M12 (422), and store the received messages as arranged in the streamlet 4101. That is, the MX node 202 receives M11 first, followed by M13, M14, and M12. Similarly, the MX node 206 can arrange the messages for the channel foo based on their respective time that each message was received by the MX node 206, e.g., M78, M79 (423), and store the received messages as arranged in the streamlet 4101. Other arrangements or ordering of the messages for the channel are possible.

The MX node 202 (or MX node 206) can store the received messages using the method for writing data to a streamlet described earlier in reference to FIG. 3A, for example. In various implementations, the MX node 202 (or MX node 206) can buffer (e.g., in a local data buffer) the received messages for the channel foo and store the received messages in a streamlet for the channel foo (e.g., streamlet 4101) when the buffered messages reach a predetermined number or size (e.g., 100 messages) or when a predetermined time (e.g., 50 milliseconds) has elapsed. For instance, the MX node 202 can store in the streamlet 100 messages at a time or in every 50 milliseconds. Other acknowledgement scheduling algorithms, such as Nagle's algorithm, can be used.

In various implementations, the Q node 212 (e.g., a handler process) stores the messages of the channel foo in the streamlet 4101 in the order as arranged by the MX node 202 and MX node 206. The Q node 212 stores the messages of the channel foo in the streamlet 4101 in the order the Q node 212 receives the messages. For instance, assume that the Q node 212 receives messages M78 (from the MX node 206) first, followed by messages M11 and M13 (from the MX node 202), M79 (from the MX node 206), and M14 and M12 (from the MX node 202). The Q node 212 stores in the streamlet 4101 the messages in the order as received, e.g., M78, M11, M13, M79, M14, and M12, immediately after the messages 421 that are already stored in the streamlet 4101. In this way, messages published to the channel foo from multiple publishers (e.g., 402, 404) can be serialized in a particular order and stored in the streamlet 4101 of the channel foo. Different subscribers that subscribe to the channel foo will receive messages of the channel foo in the same particular order, as will be described in more detail in reference to FIG. 4B.

In the example of FIG. 4A, at a time instance after the message M12 was stored in the streamlet 4101, the MX node 204 requests a grant from the channel manager 214 to write to the channel foo. The channel manager 214 provides the MX node 204 a grant to write messages to the streamlet 4101, as the streamlet 4101 is still open for writing. The MX node 204 arranges the messages for the channel foo based on the respective time that each message was received by the MX node 204, e.g., M26, M27, M31, M29, M30, M28 (424), and stores the messages as arranged for the channel foo.

By way of illustration, assume that the message M26 is stored to the last available position of the streamlet 4101. As the streamlet 4101 is now full, the Q node 212 sends to the MX node 204 a NAK message, following by an EOF message, to close the association with the MX node 204 for the write grant, as described earlier in reference to FIG. 3A. The MX node 204 then requests another write grant from the channel manager 214 for additional messages (e.g., M27, M31, and so on) for the channel foo.

The channel manager 214 can monitor available Q nodes in the messaging system 100 for their respective workloads (e.g., how many streamlets are residing in each Q node). The channel manager 214 can allocate a streamlet for the write request from the MX node 204 such that overloading (e.g., too many streamlets or too many read or write grants) can be avoided for any given Q node. For instance, the channel manager 214 can identify a least loaded Q node in the messaging system 100 and allocate a new streamlet on the least loaded Q node for write requests from the MX node 204. In the example of FIG. 4A, the channel manager 214 allocates a new streamlet 4102 on the Q node 208 and provides a write grant to the MX node 204 to write messages for the channel foo to the streamlet 4102. As shown in FIG. 4A, the Q node stores in the streamlet 4102 the messages from the MX node 204 in an order as arranged by the MX node 204: M27, M31, M29, M30, and M28 (assuming that there is no other concurrent write grant for the streamlet 4102 at the moment).

When the channel manager 214 allocates a new streamlet (e.g., streamlet 4102) for a request for a grant from an MX node (e.g., MX node 204) to write to a channel (e.g., foo), the channel manager 214 assigns to the streamlet its TTL, which will expire after TTLs of other streamlets that are already in the channel's stream. For instance, the channel manager 214 can assign to each streamlet of the channel foo's channel stream a TTL of 3 minutes when allocating the streamlet. That is, each streamlet will expire 3 minutes after it is allocated (created) by the channel manager 214. Since a new streamlet is allocated after a previous streamlet is closed (e.g., filled entirely or expired), in this way, the channel foo's channel stream comprises streamlets that each expires sequentially after its previous streamlet expires. For instance, as shown in an example channel stream 430 of the channel foo in FIG. 4A, streamlet 4098 and streamlets before 4098 have expired (as indicated by the dotted-lined gray-out boxes). Messages stored in these expired streamlets are not available for reading for subscribers of the channel foo. Streamlets 4099, 4100, 4101, and 4102 are still active (not expired). The streamlets 4099, 4100, and 4101 are closed for writing, but still are available for reading. The streamlet 4102 is available for reading and writing, at the moment when the message M28 was stored in the streamlet 4102. At a later time, the streamlet 4099 will expire, following by the streamlets 4100, 4101, and so on.

Figure 4B:
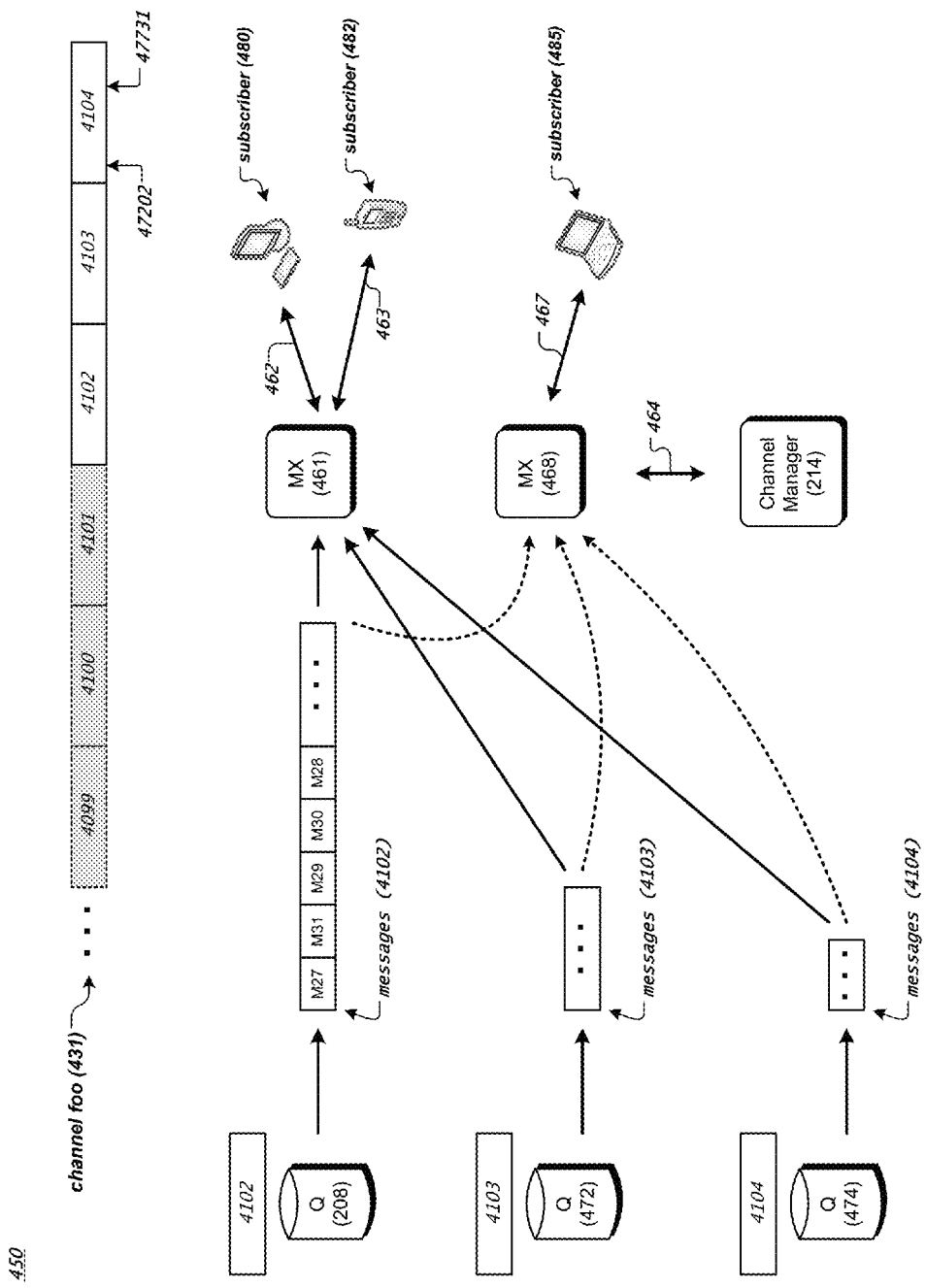
FIG. 4B is a data flow diagram of an example method for subscribing to a channel of a messaging system.

FIG. 4B is a data flow diagram of an example method for subscribing to a channel of a messaging system. In FIG. 4B, a subscriber 480 establishes a connection 462 with an MX node 461 of the messaging system 100. Subscriber 482 establishes a connection 463 with the MX node 461. Subscriber 485 establishes a connection 467 with an MX node 468 of the messaging system 100. Here, the MX nodes 461 and 468 can respectively communicate (464) with the channel manager 214 and one or more Q nodes in the messaging system 100 via the internal network 218.

A subscriber (e.g., subscriber 480) can subscribe to the channel foo of the messaging system 100 by establishing a connection (e.g., 462) and sending a request for subscribing to messages of the channel foo to an MX node (e.g., MX node 461). The request (e.g., in JSON key/value pairs) can include a channel name, such as, for example, "foo." When receiving the subscribe request, the MX node 461 can send to the channel manager 214 a request for a read grant for a streamlet in the channel foo's channel stream.

By way of illustration, assume that at the current moment the channel foo's channel stream 431 includes active streamlets 4102, 4103, and 4104, as shown in FIG. 4B. The streamlets 4102 and 4103 each are full. The streamlet 4104 stores messages of the channel foo, including the last message (at the current moment) stored at a position 47731. Streamlets 4101 and streamlets before 4101 are invalid, as their respective TTLs have expired. Note that the messages M78, M11, M13, M79, M14, M12, and M26 stored in the streamlet 4101, described earlier in reference to FIG. 4A, are no longer available for subscribers of the channel foo, since the streamlet 4101 is no longer valid, as its TTL has expired. As described earlier, each streamlet in the channel foo's channel stream has a TTL of 3 minutes, thus only messages (as stored in streamlets of the channel foo) that are published to the channel foo (i.e., stored into the channel's streamlets) no earlier than 3 minutes from the current time can be available for subscribers of the channel foo.

The MX node 461 can request a read grant for all available messages in the channel foo, for example, when the subscriber 480 is a new subscriber to the channel foo. Based on the request, the channel manager 214 provides the MX node 461 a read grant to the streamlet 4102 (on the Q node 208) that is the earliest streamlet in the active streamlets of the channel foo (i.e., the first in the sequence of the active streamlets). The MX node 461 can retrieve messages in the streamlet 4102 from the Q node 208, using the method for reading data from a streamlet described earlier in reference to FIG. 3B, for example. Note that the messages retrieved from the streamlet 4102 maintain the same order as stored in the streamlet 4102. However, other arrangements or ordering of the messages in the streamlet are possible. In various implementations, when providing messages stored in the streamlet 4102 to the MX node 461, the Q node 208 can buffer (e.g., in a local data buffer) the messages and send the messages to the MX node 461 when the buffer messages reach a predetermined number or size (e.g., 200 messages) or a predetermined time (e.g., 50 milliseconds) has elapsed. For instance, the Q node 208 can send the channel foo's messages (from the streamlet 4102) to the MX node 461 200 messages at a time or in every 50 milliseconds. Other acknowledgement scheduling algorithms, such as Nagle's algorithm, can be used.

After receiving the last message in the streamlet 4102, the MX node 461 can send an acknowledgement to the Q node 208, and send to the channel manager 214 another request (e.g., for a read grant) for the next streamlet in the channel stream of the channel foo. Based on the request, the channel manager 214 provides the MX node 461 a read grant to the streamlet 4103 (on Q node 472) that logically follows the streamlet 4102 in the sequence of active streamlets of the channel foo. The MX node 461 can retrieve messages stored in the streamlet 4103, e.g., using the method for reading data from a streamlet described earlier in reference to FIG. 3B, until it retrieves the last message stored in the streamlet 4103. The MX node 461 can send to the channel manager 214 yet another request for a read grant for messages in the next streamlet 4104 (on Q node 474). After receiving the read grant, the MX node 461 retrieves message of the channel foo stored in the streamlet 4104, until the last message at the position 47731. Similarly, the MX node 468 can retrieve messages from the streamlets 4102, 4103, and 4104 (as shown with dotted arrows in FIG. 4B), and provide the messages to the subscriber 485.

The MX node 461 can send the retrieved messages of the channel foo to the subscriber 480 (via the connection 462) while receiving the messages from the Q node 208, 472, or 474. In various implementations, the MX node 461 can store the retrieved messages in a local buffer. In this way, the retrieved messages can be provided to another subscriber (e.g., subscriber 482) when the other subscriber subscribes to the channel foo and requests the channel's messages. The MX node 461 can remove messages stored in the local buffer that each has a time of publication that has exceeded a predetermined time period. For instance, the MX node 461 can remove messages (stored in the local buffer) with respective times of publication exceeding 3 minutes. In some implementations, the predetermined time period for keeping messages in the local buffer on MX node 461 can be the same as or similar to the TTL duration of a streamlet in the channel foo's channel stream, since at a given moment, messages retrieved from the channel's stream do not include those in streamlets having respective times-to-live that had already expired.

The messages retrieved from the channel stream 431 and sent to the subscriber 480 (by the MX node 461) are arranged in the same order as the messages were stored in the channel stream, although other arrangements or ordering of the messages are possible. For instance, messages published to the channel foo are serialized and stored in the streamlet 4102 in a particular order (e.g., M27, M31, M29, M30, and so on), then stored subsequently in the streamlet 4103 and the streamlet 4104. The MX node retrieves messages from the channel stream 431 and provides the retrieved messages to the subscriber 480 in the same order as the messages are stored in the channel stream: M27, M31, M29, M30, and so on, followed by ordered messages in the streamlet 4103, and followed by ordered messages in the streamlet 4104.

Instead of retrieving all available messages in the channel stream 431, the MX node 461 can request a read grant for messages stored in the channel stream 431 starting from a message at particular position, e.g., position 47202. For instance, the position 47202 can correspond to an earlier time instance (e.g., 10 seconds before the current time) when the subscriber 480 was last subscribing to the channel foo (e.g., via a connection to the MX node 461 or another MX node of the messaging system 100). The MX node 461 can send to the channel manager 214 a request for a read grant for messages starting at the position 47202. Based on the request, the channel manager 214 provides the MX node 461 a read grant to the streamlet 4104 (on the Q node 474) and a position on the streamlet 4104 that corresponds to the channel stream position 47202. The MX node 461 can retrieve messages in the streamlet 4104 starting from the provided position, and send the retrieved messages to the subscriber 480.

As described above in reference to FIGS. 4A and 4B, messages published to the channel foo are serialized and stored in the channel's streamlets in a particular order. The channel manager 214 maintains the ordered sequence of streamlets as they are created throughout their respective times-to-live. Messages retrieved from the streamlets by an MX node (e.g., MX node 461, or MX node 468) and provided to a subscriber can be, in some implementations, in the same order as the messages are stored in the ordered sequence of streamlets. In this way, messages sent to different subscribers (e.g., subscriber 480, subscriber 482, or subscriber 485) can be in the same order (as the messages are stored in the streamlets), regardless which MX nodes the subscribers are connected to.

In various implementations, a streamlet stores messages in a set of blocks of messages. Each block stores a number of messages. For instance, a block can store two hundred kilobytes of messages. Each block has its own TTL, which can be shorter than the TTL of the streamlet holding the block. Once a block's TTL has expired, the block can be discarded from the streamlet holding the block, as described in more detail below in reference to FIG. 4C.

Figure 4C:
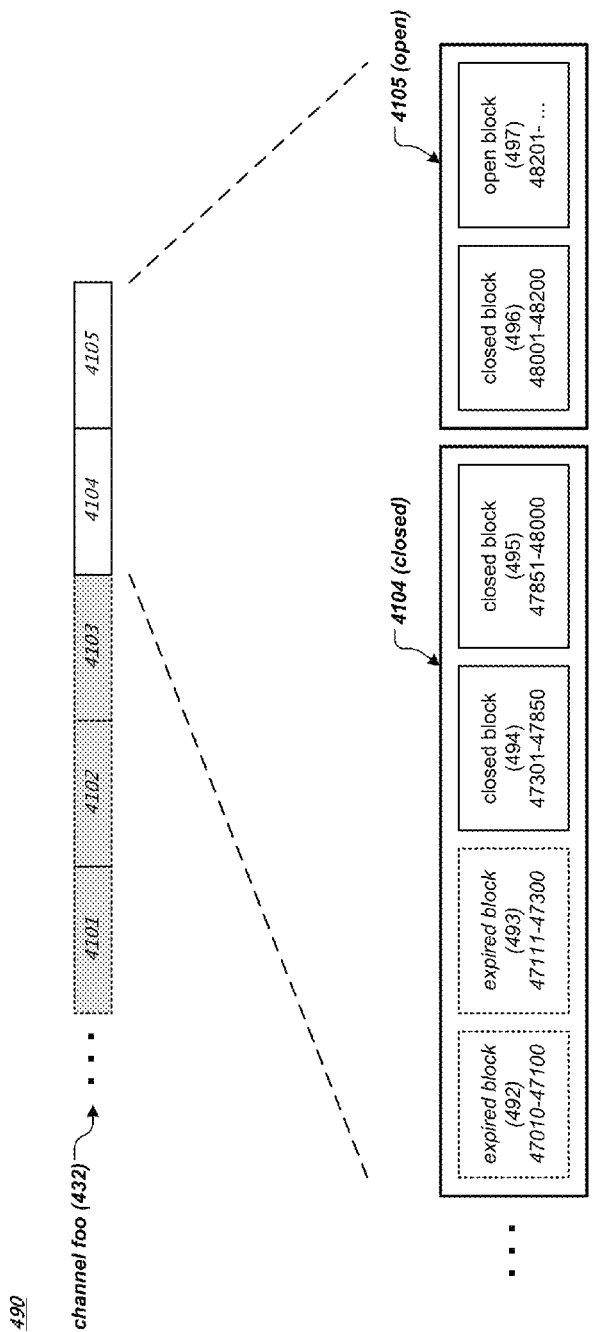
FIG. 4C is an example data structure for storing messages of a channel of a messaging system.

FIG. 4C is an example data structure for storing messages of a channel of a messaging system. As described with the channel foo in reference to FIGS. 4A and 4B, assume that at the current moment the channel foo's channel stream 432 includes active streamlets 4104 and 4105, as shown in FIG. 4C. Streamlet 4103 and streamlets before 4103 are invalid, as their respective TTLs have expired. The streamlet 4104 is already full for its capacity (e.g., as determined by a corresponding write grant) and is closed for additional message writes. The streamlet 4104 is still available for message reads. The streamlet 4105 is open and is available for message writes and reads.

By way of illustration, the streamlet 4104 (e.g., a computing process running on the Q node 474 shown in FIG. 4B) currently holds two blocks of messages. Block 494 holds messages from channel positions 47301 to 47850. Block 495 holds messages from channel positions 47851 to 48000. The streamlet 4105 (e.g., a computing process running on another Q node in the messaging system 100) currently holds two blocks of messages. Block 496 holds messages from channel positions 48001 to 48200. Block 497 holds messages starting from channel position 48201, and still accepts additional messages of the channel foo.

When the streamlet 4104 was created (e.g., by a write grant), a first block (sub-buffer) 492 was created to store messages, e.g., from channel positions 47010 to 47100. Later on, after the block 492 had reached its capacity, another block 493 was created to store messages, e.g., from channel positions 47111 to 47300. Blocks 494 and 495 were subsequently created to store additional messages. Afterwards, the streamlet 4104 was closed for additional message writes, and the streamlet 4105 was created with additional blocks for storing additional messages of the channel foo.

In this example, the respective TTL's of blocks 492 and 493 had expired. The messages stored in these two blocks (from channel positions 47010 to 47300) are no longer available for reading by subscribers of the channel foo. The streamlet 4104 can discard these two expired blocks, e.g., by de-allocating the memory space for the blocks 492 and 493. The blocks 494 or 495 could become expired and be discarded by the streamlet 4104, before the streamlet 4104 itself becomes invalid. Alternatively, streamlet 4104 itself could become invalid before the blocks 494 or 495 become expired. In this way, a streamlet can hold one or more blocks of messages, or contain no block of messages, depending on respective TTLs of the streamlet and blocks, for example.

A streamlet, or a computing process running on a Q node in the messaging system 100, can create a block for storing messages of a channel by allocating a certain size of memory space from the Q node. The streamlet can receive, from an MX node in the messaging system 100, one message at a time and store the received message in the block. Alternatively, the MX node can assemble (i.e., buffer) a group of messages and send the group of messages to the Q node. The streamlet can allocate a block of memory space (from the Q node) and store the group of messages in the block. The MX node can also perform compression on the group of messages, e.g., by removing a common header from each message or performing other suitable compression techniques.

As described earlier, an MX node can retrieve messages from Q nodes, store (cache) the retrieved messages in a local buffer, and provide the retrieved messages to multiple subscribers from the local buffer. In this way, the MX node can support a large number (e.g., thousands or more) of subscribers (e.g., of a particular channel), without creating a network bottleneck at Q nodes where messages are stored (in streamlets). The messaging system 100 can further scale up the number of subscribers by adding additional MX nodes that each can cache messages and support additional subscribers.

When an MX node provides a locally cached message to multiple subscribers, a sender process running on the MX node can send copies of the cached message to destination processes (running on the MX node) that each corresponds to a connection to one of the subscribers. However, with a large number (e.g., thousands) of subscribers, copies of the cached message (e.g., created by the sender process for different destination processes) can cause a high demand of memory usage on the MX node. If the sender process sends the cached message sequentially to different destination processes, blocking (for synchronization) between the destination processes can cause computing resource contention on the MX node.

Particular implementations described herein utilize a delivery buffer (i.e., a "fast buffer") in an MX Node that can be used to cache messages retrieved from a Q node. The fast buffer includes data blocks for storing the retrieved messages. As described further below, each data block has a respective TTL that is longer than a read operation time associated with reading data from the fast buffer. This may prevent expiration of the data block while data is being read from the buffer and/or sent to subscribers. In certain instances, the TTL of a data block is longer than a corresponding streamlet's TTL. A process (running on the MX node) for a subscriber can read messages stored in one or more of the data blocks of the fast buffer, depending on the subscriber's connection status to the MX node. Processes for multiple subscribers can read messages from a single shared data structure (the fast buffer), without creating multiple copies for each message. In preferred implementations, multiple MX nodes are able to read from the fast buffer (e.g., the same data) simultaneously, without blocking or interfering with each other and without modifying the data in the fast buffer. For example, a first read process on the MX node can read messages from the fast buffer without blocking (e.g., causing suspension of) a second read process that is on the same MX node but may reside on a different processor core of the MX node.

Figure 5:
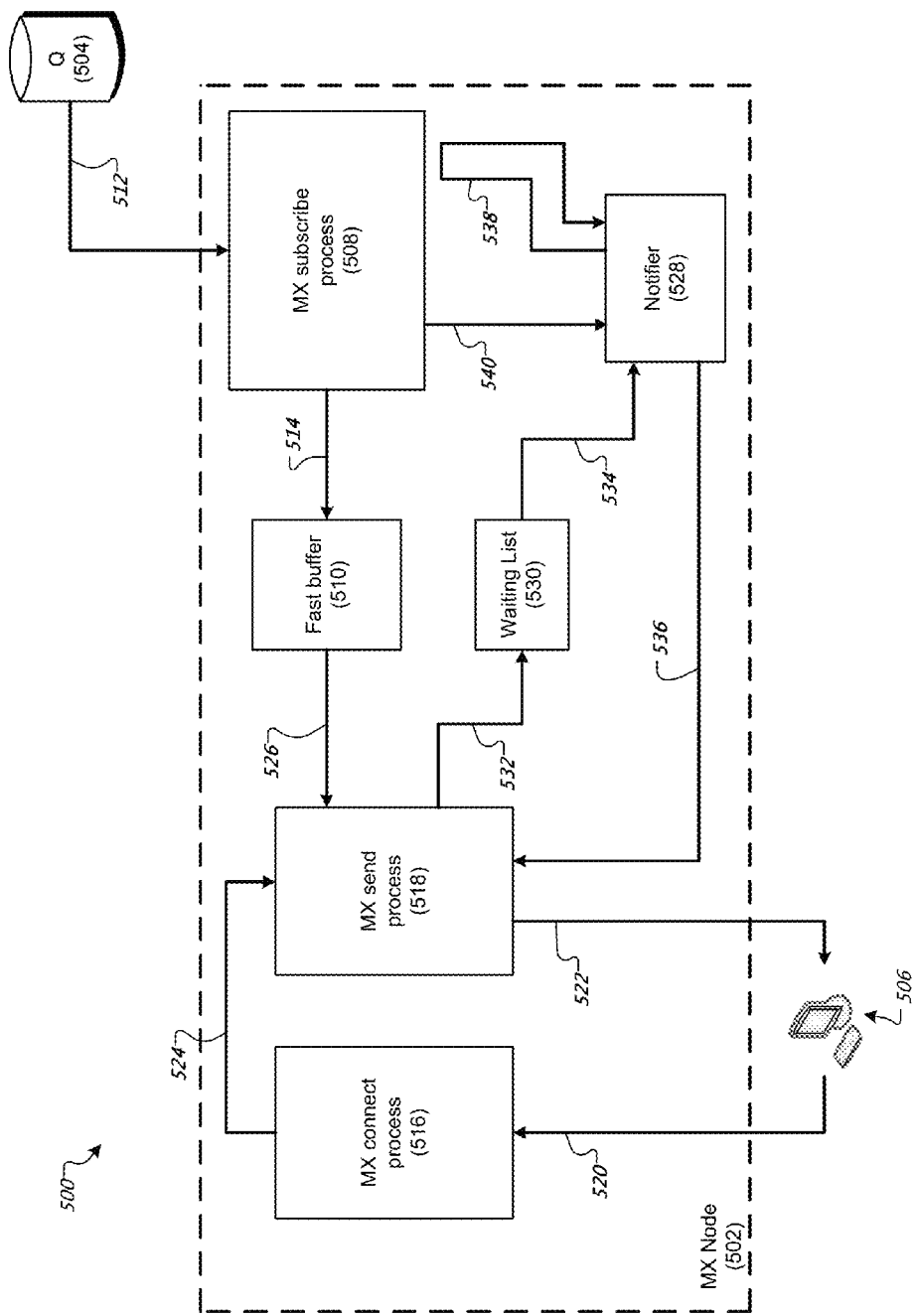
FIG. 5 is a schematic diagram of an MX Node retrieving messages from a Q node and providing the retrieved messages to a subscriber of a messaging system.

FIG. 5 is an example system 500 in which an MX node 502 retrieves messages from a Q node 504 and provides the messages to a client device 506 of a subscriber. The MX node 502 can include an MX subscribe process 508 and a fast buffer 510. The MX subscribe process 508 can use a connection 512 to read messages stored on the Q node 504 (e.g., in a streamlet) and can use a connection 514 to provide the messages to the fast buffer 510 for storage. The fast buffer 510 may store the messages in one or more blocks, with each block having a TTL. In preferred implementations, the fast buffer 510 can be a shared, lock-free structure that holds the data blocks and expires old data periodically (e.g., when the old data is no longer being read by MX processes or requested by subscribers or after a specified or predetermined time period).

In certain examples, the MX node 502 can also include an MX connect process 516 and an MX send process 518 for establishing communications with one or more client devices, such as client device 506. In the depicted example, the client device 506 connects to the MX connect process 516 using a connection 520 and requests messages from the MX node 502 for one or more channels. The client device 506 can request, for example, messages of the channel foo starting at a particular position, such as the position 47202. An example JSON version of this specific request is as follows:

{
  "action": "pubsub/subscribe",
  "body" }
    "channel": "foo",
    "position": 47202
  }
}

In response to the request, the MX connect process 516 sends an instruction 524 to the MX send process 518 to retrieve message data stored in the fast buffer 510 (e.g., starting at the position 47202 of the channel foo). The MX send process 518 then retrieves the message data from the fast buffer 510 using a connection 526 and sends the messages to the client device 506 through a connection 522.

The MX subscribe process 508 and the fast buffer 510 are preferably instantiated on a per-channel basis and/or devoted to retrieving and storing messages for a single channel. Additional MX subscribe processes and/or fast buffers may be included in the MX node 502 to retrieve and store messages for additional channels. In alternative implementations, the MX subscribe process 508 and the fast buffer 510 can be configured to retrieve and store messages for multiple channels. For example, the MX node 502 may include one MX subscribe process 508 and one fast buffer 510 for retrieving and storing messages for the multiple channels.

Likewise, the MX connect process 516 and the MX send process 518 are preferably instantiated on a per-client connection basis and/or devoted to establishing communications with a single client device (e.g., the client device 506). Additional MX connect processes and MX send processes may be included on the MX node 502 to establish communications with additional client devices and retrieve and send messages from one or more fast buffers. In alternative implementations, the MX connect process 516 and MX send process 518 can be configured to connect with and serve multiple client devices. For example, the MX node 502 may include one MX connect process 516 and one MX send process 518 for receiving requests from client devices (including client device 506) and sending messages to the client devices (e.g., for one or more channels), respectively.

In general, the blocks of data delivered to the MX subscribe process 508 from the Q node 504 can be stored in the fast buffer 510 in the same order as the blocks were received by the fast buffer 510, although other arrangements or ordering of the data blocks are possible. The blocks are preferably given an offset and a timestamp. This allows the blocks to be located and retrieved from the fast buffer 510 and/or allows the MX subscribe process 508 to identify any blocks that are older than their TTL and/or otherwise unavailable for reading. Offsets are generally assigned in ascending order, with blocks added one-by-one to a back portion of a single queue or linked list (e.g., a forward list) in the fast buffer 510.

In certain examples, when accessing or reviewing blocks in the fast buffer 510, the MX subscribe process 508 may categorize each block as being, for example, active, inaccessible, or expired, although other designations or categorizations are possible. In general, active blocks are "young" blocks whose TTLs have not expired. Active blocks reside in a visible or otherwise accessible area of the fast buffer 510 and may be accessed with new read requests. Inaccessible blocks are "middle-aged" blocks whose TTLs are about to expire. Inaccessible blocks reside in an invisible or otherwise restricted or no access area of the fast buffer 510 and may be accessed only by read processes that have an established connection (e.g., a previously granted read request). If the TTL of an inaccessible block expires during a read process, the block becomes expired, but the read process may be given additional time to finish reading data from the block. Expired blocks reside in the invisible area of the fast buffer 510 and are deleted periodically from the fast buffer 510.

For example, when the MX subscribe process 508 determines that one or more blocks are expired, the MX subscribe process 508 may shrink the queue in the fast buffer 510. For example, the MX subscribe process 508 may shrink a head, a tail, or other suitable portion of the fast buffer 510, so that the expired blocks are removed from the queue and are no longer accessible. In some implementations, however, expired blocks may remain available for reading for additional time to accommodate certain processes that were unable to read messages from the blocks within their TTLs. For example, client devices (and associated MX send processes) having a current or pre-existing connection to the MX node 502 (e.g., a pre-existing read request) may be allowed to read data from inaccessible and/or expired blocks. On the other hand, client devices (and associated MX send processes) having a new connection to the MX node 502 (e.g., with no pre-existing read request) may not be allowed to read data from inaccessible and/or expired blocks. Such client devices with new connections may be limited to reading only active blocks that are presently in a visible or accessible portion of the queue. This approach gives preference to pre-existing connections or pre-existing read requests and allows the corresponding client devices to avoid any gaps in received message data. Such gaps may occur, for example, due to slow connection speeds and/or temporary lapses in a connection. On the other hand, new connections generally do not need to access the older blocks to fill in any gaps, because the new connections have not yet read any message data and can start by reading the unexpired blocks. In various examples, a "pre-existing connection" refers to a connection with which an MX send process has requested and read messages from the fast buffer 510. In various examples, a "new connection" refers to a connection with which an MX send process has not yet read any messages from the fast buffer 510.

Advantageously, this approach of categorizing blocks and periodically deleting expired blocks provides improved control over memory usage. The amount of memory used by channel data can be dynamically allocated and/or can change over time according to demand. For example, as message activity for a channel decreases, the amount of memory used for the channel can automatically decrease, as expired blocks are deleted and fewer new blocks are created. Also, expired blocks can be deleted after existing read processes have had a chance to read the message data and the message data in the blocks is no longer needed. The approach also provides flexibility to add one or more processing steps (e.g., encryption, compression, etc.), and ensures that such steps are not processing or attempting to access memory that has been freed.

In preferred implementations, the MX subscribe process 508 can be the only process having authority to modify the structure of the fast buffer 510. For example, the MX subscribe process 508 may be configured and allowed to add blocks to the fast buffer 510, remove blocks from the fast buffer 510, and/or modify blocks on the fast buffer 510, as needed. The MX subscribe process 508 may also move pointers that identify a head portion and a tail portion of a queue or linked list in the fast buffer 510. Other processes or MX node components are preferably not allowed to perform such modifications. By giving such authority only to the MX subscribe process 508, the need for any locks in the modification operations is eliminated.

In certain examples, the MX send process 518 can check the front (i.e., head) and back (i.e., tail) of the fast buffer 510 at the beginning of every read operation. When the MX send process 518 is requesting to read a target block, and the target block resides in an accessible or visible region of the fast buffer 510 (e.g., because the target block is an active block), the MX send process 518 may read the block from the fast buffer 510 and forward the message data in the block to the client device 506. When the MX send process 518 is requesting to read data from more than one block in the accessible region of the fast buffer 510, the MX send process 518 may read an amount of data (e.g., up to 64 Kb) from the fast buffer 510 (e.g., starting from a block having a requested offset or location in the fast buffer 510) and forward the message data to the client device 506. In certain instances, when the MX send process 518 detects that a target data block is not accessible in the fast buffer 510 (e.g., because the target block has expired), the MX send process 518 may apply a separate logic that involves error reporting and/or waiting. The separate logic used by the MX send process 518 may depend on where the target block resides in comparison to accessible regions of the fast buffer 510.

For example, in some instances, when a client connection is too slow to remain in sync with fast moving channel data, the client may be unsubscribed from the channel and a message may be sent to inform that client that it is "out of sync" with the channel's data. Alternatively, rather than sending the "out of sync" message to the client, the client may be fast forwarded to the oldest data available (e.g., the oldest active block) or to the newest data available (e.g., the newest active block). In certain instances, the systems and methods may identify one or more key active blocks (e.g., as indicated by one or more flags), forward the data from the key active blocks to the client, and then fast forward the client to the newest active block for further reading. The client may have certain preferences that define how error reporting and/or waiting are to be performed. For example, the client may have a preference that causes its state to be reloaded completely (e.g., when the client loses a connection and is able to reconnect).

In various examples, the MX send process 518 can read the accessible blocks in the fast buffer 510 and then can wait to be notified when additional blocks are added to the fast buffer 510 and available for reading. For example, when the MX send process 518 reaches a tail of the fast buffer 510, the MX send process 518 may turn on or activate a notifier 528 and/or yield to other processes. The notifier 528 can be configured to wake up the MX send process 518 upon the arrival of new data into the fast buffer 510. To activate the notifier 528, the MX send process 518 may send its process identifier (PID) or other suitable identifier to a waiting list 530 along a connection 532. The MX send process 518 may then perform a second check of the fast buffer 510 for new data and, if no new data is present, the MX send process 518 may go to sleep and wait for a message from the notifier 528. Checking the fast buffer 510 again after providing the PID to the waiting list 530 may allow the MX send process 518 to identify the presence of any new data that arrived just before or at around the same time as the PID was added to the waiting list 530. In general, the waiting list 530 includes a list of PIDs for one or more MX send processes that are waiting to be notified when new data arrives in the fast buffer 510. The waiting list 530 may provide PIDs to the notifier 528 along a connection 534, and the notifier 528 may wake up or notify the MX send processes in the waiting list 530 when new data arrives in the fast buffer 510 and is available for reading. For example, the notifier 528 may wake up the MX send process 518 by sending a notification along a connection 536. Like the MX subscribe process 508 and the fast buffer 510, the waiting list 530 and the notifier 528 are preferably configured to perform operations for a single channel. The MX node 502 may include additional waiting lists and notifiers to perform operations for additional channels. In alternative implementations, the waiting list 530 and the notifier 528 can be configured to perform operations for multiple channels. For example, the MX node 502 may include one waiting list 530 and one notifier 528 for receiving PIDs of MX send processes and waking up the corresponding MX send processes, respectively, when new data arrives in the fast buffer 510 for the multiple channels.

In preferred examples, the notifier 528 can work together and/or can be synchronized with the MX subscribe process 508. When a new block of data is added to the fast buffer 510, the notifier 528 may receive a list of PIDs from the waiting list 530 for the one or more MX send processes waiting to be notified. The notifier 528 then delivers a notification to the one or more MX send processes. The notification preferably includes the offset or location of the new block in the fast buffer 510. After sending the notifications, the PIDs for the one or more MX send processes may be removed from the waiting list 530.

In certain implementations, to keep the latency low, the notifier 528 can use a two-level model of synchronization with the MX subscribe process 508. In an inner loop 538, the notifier 528 may contact the MX subscribe process 508 at short time intervals (e.g., every 10 ms) to determine if any new blocks have been added to the fast buffer 510. The notifier 528 may, for example, read from a dictionary or log of the MX subscribe process 508 to determine the offset of the block most recently added to the fast buffer 510. If the most recent block has not changed for more than a threshold amount of time (e.g., more than 200 ms), the notifier 528 may switch to an outer loop 540 where the notifier 528 goes to sleep and/or waits for a notification from the MX subscribe process 508. In the outer loop 540, the MX subscribe process 508 preferably checks the state of the notifier 528 and wakes up the notifier 528 by sending a notification when the notifier 528 is sleeping and new data has been sent to the fast buffer 510. In general, since checking the state of the notifier 528 is a significantly faster operation than delivering the notification, this approach allows the MX subscribe process 508 to look for new data on the Q node more frequently and to add any such new data to the fast buffer 510. When the MX subscribe process 508 informs the notifier 528 that a new block has been added to the fast buffer 510, the notifier 528 may switch back to the inner loop 538. The two-loop approach allows the MX node 502 to conserve resources and operate more efficiently. The notifier 528 actively looks for new message data only when message data is being added to the fast buffer frequently. Otherwise, the notifier 528 is able to sleep and is woken up by the MX subscribe process 508 when new data arrives. A primary benefit of the two-loop approach is that resources are used only when there is work to do or when work is expected in the near future. If new channel data is not expected soon, the system switches from the inner loop 538 to the use of push notifications in the outer loop 540. The two-loop approach achieves a good balance between latency and central processing unit (CPU) overhead. The outer loop 540 allows the system to maintain millions of channels that are rarely updated and not waste a single CPU cycle on checking the status of such channels. At the same time, the inner loop 538 allows the system to maintain with minimal latency other channels that are updated more frequently.

In certain implementations, when the notifier 528 becomes aware of new data added to the fast buffer 510, the notifier 528 sends a notification to any MX send processes waiting for the new data. For example, the notifier 528 may obtain from the waiting list 530 the PIDs of MX send processes that are sleeping and waiting for new data and may send notifications to those MX send processes. The notifications preferably include the offset or other location information for any new blocks of data in the fast buffer 510.

In various examples, the systems and methods allow publishers to be prioritized (or deprioritized) with respect to subscribers. For example, the fast buffer 510 can be considered to (i) receive data from publishers in a publishing loop and (ii) provide data to subscribers in a subscribing loop. The publishing loop can include, for example, a step of obtaining new message data from one or more publishers and a step of writing the new message data to the fast buffer 510. The subscribing loop can include, for example, a step of checking the fast buffer 510 for new data and a step of providing the new data to one or more subscribers (e.g., using the MX send process 518). In preferred examples, the publishing loop and the subscribing loop are loosely coupled or not coupled, such that publishing and subscribing speeds can be independently controlled and/or prioritized. This allows a publishing speed to be different from a subscribing speed, if desired, and/or for each speed to be chosen or prioritized, for example, according to system load. To promote publishing activity, for example, the steps of the publishing loop can be performed faster, so that message data can be written more frequently to the fast buffer 510. Alternatively or additionally, to promote subscribing activity, the steps of the subscribing loop can be performed faster, so that message data can be read more frequently from the fast buffer 510. In general, when the steps of one loop are performed faster, the steps of the other loop can be performed slower, for example, to maintain overall system load at or near a constant value and/or to avoid excessive system load. Such prioritization can be achieved, for example, by creating two worker pools (e.g., one pool for publishers and one pool for subscribers) and using an operating system kernel scheduler prioritization mechanism to set different priorities to threads in the two pools. Other approaches for prioritizing or deprioritzing publishers and subscribers are contemplated.

Figure 6:
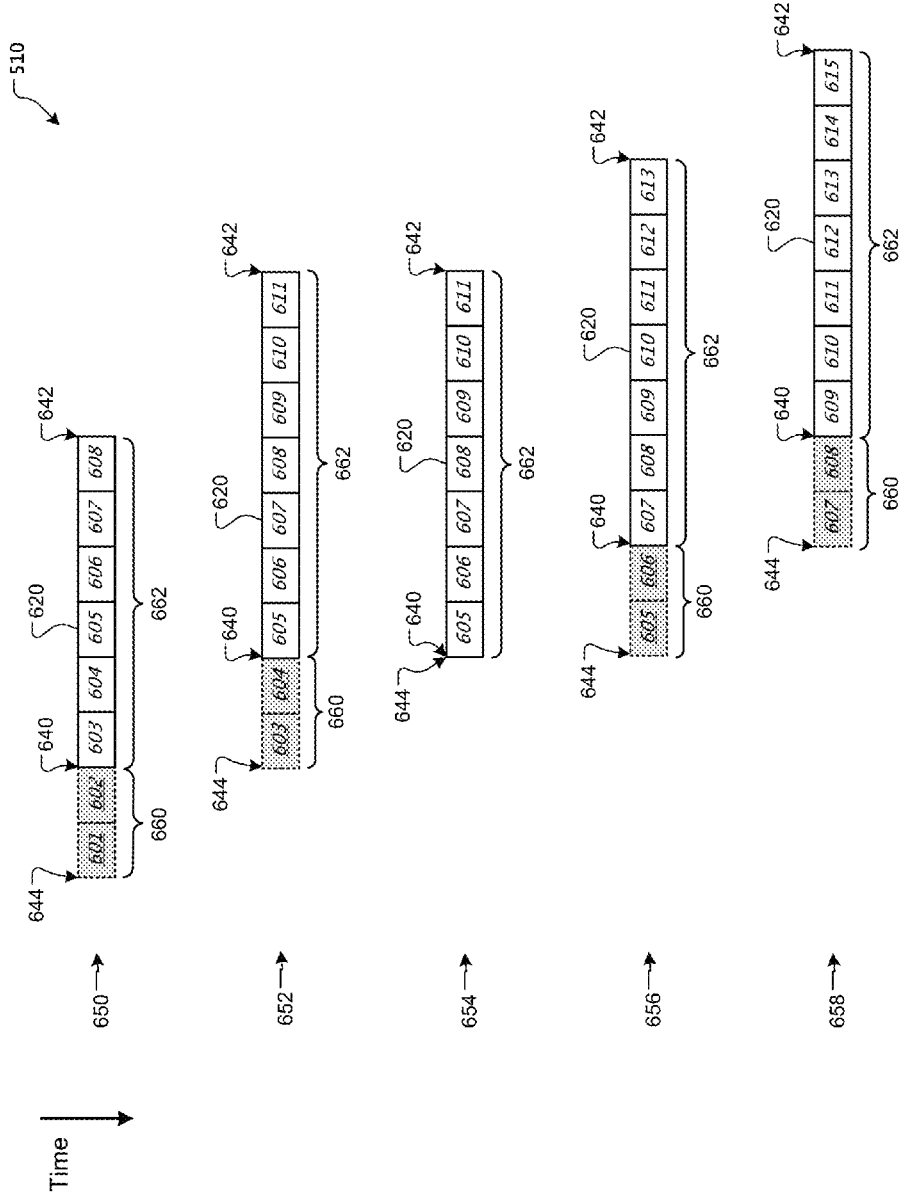
FIG. 6 shows example data blocks of a fast buffer in an MX node of a messaging system at different time instances.

FIG. 6 shows example data blocks of the fast buffer 510 at different instances in time. At a first time 650, the fast buffer 510 includes a sequence of data blocks 601, 602, . . . , 608, that were retrieved from one or more streamlets in the Q node 504. The sequence of message data in the data blocks is preferably consistent with or the same as the sequence of message data from the one or more streamlets in the Q node 504.

Each data block 601, 602, . . . , 608 in the fast buffer 510 is given a respective TTL. In preferred implementations, the TTLs for the blocks are sufficient in duration to give read processes enough time to read data from the blocks. In some instances, the TTLs for one or more blocks are longer than the TTLs for one or more streamlets in the Q node 504. In general, the TTLs for the blocks are chosen to give the MX send processes adequate time to read from the fast buffer 510. In one example, the TTL for the blocks in the fast buffer 510 is about 30 seconds or about 60 seconds, while the TTL for the streamlets in the Q node 504 is about 10 seconds, although other TTLs for the blocks and the streamlets are possible. This way, the fast buffer 510 (on the MX node 502) can hold more messages (e.g., messages for the past 30 seconds) than the streamlets can hold (e.g., messages for the past 10 seconds) for the particular channel. The MX node 502 can thus provide a longer history of messages to client devices of subscribers (e.g., client device 506). This is beneficial, for example, when a client device has a slower connection and/or otherwise takes longer (e.g., exceeding 10 seconds) to read messages that may no longer be accessible or stored in streamlets of the Q node 504.

In various examples, there can be three global always-accessible pointers inside the fast buffer 510: a tail pointer 642 identifying a rightmost block of a visible area 662 (i.e., block 608 at time 650), a head pointer 640 identifying a leftmost block of the visible area 662 (i.e., block 603 at time 650), and a previous head pointer 644 identifying a leftmost block of an invisible area 660 (i.e., block 601 at time 650). All blocks referenced by pointers represent a single linked list (e.g., a forward list) so all such pointers can be reached by iterating from a first block in the list (e.g., block 601 at time 650) using the block's next pointer. In certain examples, the visible area 662 includes blocks that are active and the invisible area 660 includes blocks that are inaccessible and/or expired.

In the sequence of data blocks of the fast buffer 510, data blocks closer to the head pointer 640 of the fast buffer 510 have been in the fast buffer 510 longer than blocks closer to the tail pointer 642 of the fast buffer 510. Accordingly, blocks near the head pointer 640 will generally reach their respective TTLs and expire before blocks near the tail pointer 642 reach their TTLs and expire. For instance, at the first time 650, block 603 will expire before block 604, which will expire before block 605, and so on. In general, messages in the fast buffer 510 are arranged in the same order as the messages were arranged in the Q node 504, although other arrangements or ordering of the messages are possible. Accordingly, the messages may expire in the fast buffer 510 in the same order that the messages expire in the Q node 504.

In preferred implementations, the sequence of data blocks of the fast buffer 510 can be arranged as a linked list 620. In the linked list 620, each data block has a pointer pointing to the next data block in the sequence of the list. For instance, data block 604 has a pointer pointing to data block 605, which has a pointer pointing to data block 606. Data block 608, located at a tail end of the linked list 620, may have a pointer (e.g., NUL) indicating that it is at the tail end of the linked list 620. In one implementation, the linked list 620 includes the head pointer 640 identifying the block at the head of the linked list 620. At time 650, for example, the linked list 620 may have a head pointer 640 identifying data block 603, which has not reached its TTL but will be the next block in the linked list 620 to expire.

In certain instances, when the MX subscribe process 508 adds data to the fast buffer 510, the MX subscribe process 508 can do two things. First, the MX subscribe process 508 can determine the age of the oldest block(s) in the visible area 662 (i.e., block 603 at time 650), to determine whether the oldest block(s) should be moved to the invisible area 660. If one or more blocks in the visible area 662 are inaccessible (i.e., because their TTLs will expire soon) or have expired, the MX subscribe process 508 may move the one or more blocks to the invisible area 660 or delete the one or more blocks from the fast buffer 510. In one example, blocks that are inaccessible are moved to the invisible area 660 and blocks that have expired are deleted. The process of deleting or removing one or more blocks from the fast buffer 510 may be referred to herein as "shrinking". Next, the MX subscribe process 508 can add one or more blocks of the data to a tail of the fast buffer 510.

In preferred examples, the shrinking and adding processes are done without the use of locks or atomic operations, and resulting changes are preferably made in a conflict free order. In general, locks or atomic operations are a significant source of poor performance on symmetric multiprocessing (i.e., SMP or multi core) systems. Every such operation must ensure that core or non-uniform memory access (NUMA) node caches do not have a cached value that can be read right after a change was made. Locks and/or atomic operations are expensive on modern CPUs and can cost hundreds of CPU cycles. By relying on time, however, the fast buffer 510 performs truly in parallel, such that multiple read processes can read from the same memory simultaneously. With the fast buffer approach described herein, preferably nothing other than boundary pointers requires a synchronization during the shrinking and adding processes.

Referring to times 650 and 652 in FIG. 6, shrinking is preferably done with the following technique. First, expired blocks in the invisible area 660 are deleted. In some examples, expired or inaccessible blocks in the invisible area 660 that are younger than some threshold time (e.g., TTL*1.5) are retained in the invisible area 660. The previous head pointer 644 is then moved to the current location of the head pointer 640, and the head pointer 640 is moved toward the tail pointer 642 until a block is found that is active (e.g., block 605 at time 652). The head pointer 640 is placed at the front edge of that first active block. If no active blocks are found, the head pointer 640 and the tail pointer 642 may mark the same location, indicating that the fast buffer 510 includes no active blocks.

The shrinking process is further illustrated at times 652, 654, and 658 for the fast buffer 510 in FIG. 6. At time 652, the head pointer 640 and previous head pointer 644 have been moved, such that expired blocks 601 and 602 have been removed and no longer reside in the invisible area 660, and the invisible area 660 now includes blocks 603 and 604. The tail pointer 642 has also been moved to define a new tail at block 611. Likewise, at time 654, the head pointer 640 and the previous head pointer 644 have been moved, such that expired blocks 603 and 604 have been removed and no longer reside in the invisible area 660. At this time, the invisible area 660 includes no blocks and the head pointer 640 and the previous head pointer 644 mark the same location (i.e., block 605 at time 654). Each block in the fast buffer 510 at time 654 is active and resides in the visible area 662. Further, at time 658, the head pointer 640 and the previous head pointer 644 have been moved, such that expired blocks 605 and 606 have been removed and no longer reside in the invisible area 660. The invisible area 660 at that time includes blocks 607 and 608, and the previous head pointer 644 has been moved to identify the leftmost block of the invisible area 660 (i.e., block 607 at time 658). The tail pointer 642 at time 658 has been moved to define a new tail at block 615, while the head pointer 640 at time 658 has been moved to define a new head at block 609.

In general, because there are typically many MX send processes reading from the fast buffer 510 in parallel, shrinking the fast buffer 510 and repositioning the pointers preferably occurs while certain MX send processes continue to have access to blocks in the new invisible area 660. The invisible area 660 (e.g., including blocks 603 and 604 at time 652) may therefore be left accessible to existing MX send processes and not freed instantly. This allows existing read requests for MX send processes to continue accessing inaccessible and/or expired blocks after the blocks have been moved from the visible area 662 to the invisible area 660.

On the other hand, MX send processes that are new and/or have new read requests may be given access only to the active blocks in the visible area 662 of the fast buffer 510. In preferred examples, each MX send process (e.g., MX send process 518) having a new read request checks the boundaries of the visible area 662 and if the process requests access outside of the visible area 662 (e.g., to any blocks between the previous head and the head), the request fails as if there were no data available for the request. In general, MX send processes having new requests are not allowed to access any inaccessible or expired blocks in the invisible area 660. In preferred examples, the invisible area 660 can be accessed only by MX send processes having old requests, and the MX send processes preferably finish the read operation from the invisible area 660 as soon as possible. Typical reading times take a few microseconds or milliseconds, because there are preferably no locks in the reading code.

In general, blocks reside in the visible area 662 for approximately one TTL and are then moved to the invisible area 660 where the blocks reside for some fraction (e.g., 0.25, 0.5, or 0.75) of the TTL. For example, after spending approximately one TTL in the visible area 662, a block may reside in the invisible area 660 for an additional TTL*0.5. This time in the invisible area 660 is generally many orders of magnitude longer than a typical access time and provides pre-existing MX send processes with additional time to obtain the requested message data. As discussed previously, a block resides in the visible area 662 when the block is active and is moved to the invisible area 660 when the block is inaccessible or expired.

In one example, to add blocks to the fast buffer 510, new blocks are combined into a separate single linked list 620 that is linked to the block identified by the current tail pointer 642. The tail pointer 642 is then moved to the last added block. This block addition process is illustrated in FIG. 6 at times 652, 656, and 658. At each of these times, new blocks have been added to the fast buffer 510, compared to the previous time, and the tail pointer 642 has been moved to identify the last added block. For example, at time 652, new blocks 609, 610, and 611 have been added and the tail pointer 642 points to the right-hand edge of block 611, indicating that block 611 is the last added block. Likewise, at time 656, new blocks 612 and 613 have been added, and the tail pointer 642 indicates block 613 is the last added block. Further, at time 658, blocks 614 and 615 have been added, and the tail pointer 642 indicates block 615 is the last added block.

In certain instances, a data block contains zero messages and may serve as a gap block or a left boundary marker. Gap blocks may be used when there is a gap in block positions in the fast buffer 510 (e.g., when a previous block position plus a previous block length does not equal a next block position). Such gaps can be due to, for example, switching from one streamlet to another streamlet (e.g., streamlets that are 16 m in size can be aligned by a 16 m boundary) or missing data, in which case clients reaching the gap in the buffer may need to be informed about and/or provided with the missing data. A left boundary marker may be a zero message block or marker that indicates the leftmost available location in the fast buffer 510 where data was first written or intended to be written. The zero message block may contain the leftmost offset even when no data is available yet. In such instances, the left boundary marker can help the MX node 502 make decisions about certain read requests and whether it will be possible to provide a client device with the requested data. Having the left boundary defined for every read request may make it possible to determine whether the read request can be satisfied in the future (e.g., when data is received) or not.

In general, the fast buffers described herein are internal components inside a distributed Pub Sub system. While fast buffers can be included in or used by MX nodes, as shown in FIG. 5, fast buffers can also be included in or used by other system components, including Q nodes. A fast buffer publisher is, in general, a component that writes data to a fast buffer, and a fast buffer subscriber is a component that reads data from a fast buffer. As shown in FIG. 5, for example, the MX subscribe process 508 is a fast buffer publisher and the MX send process 518 is a fast buffer subscriber, for the fast buffer 510 in MX node 502. Similar fast buffer publishers and fast buffer subscribers can be used for Q nodes. In one example, a Q node fast buffer publisher is referred to as a Q streamlet process and a Q node fast buffer subscriber is referred to as a Q sender process. Fast buffers incorporated into or used by Q nodes can use the notifier and/or waiting list approach described herein with respect to MX node 502. For example, a Q sender process waiting to retrieve new message data from a Q node fast buffer can be put to sleep when no data is available and/or woken up when new message data arrives.

Figure 7:
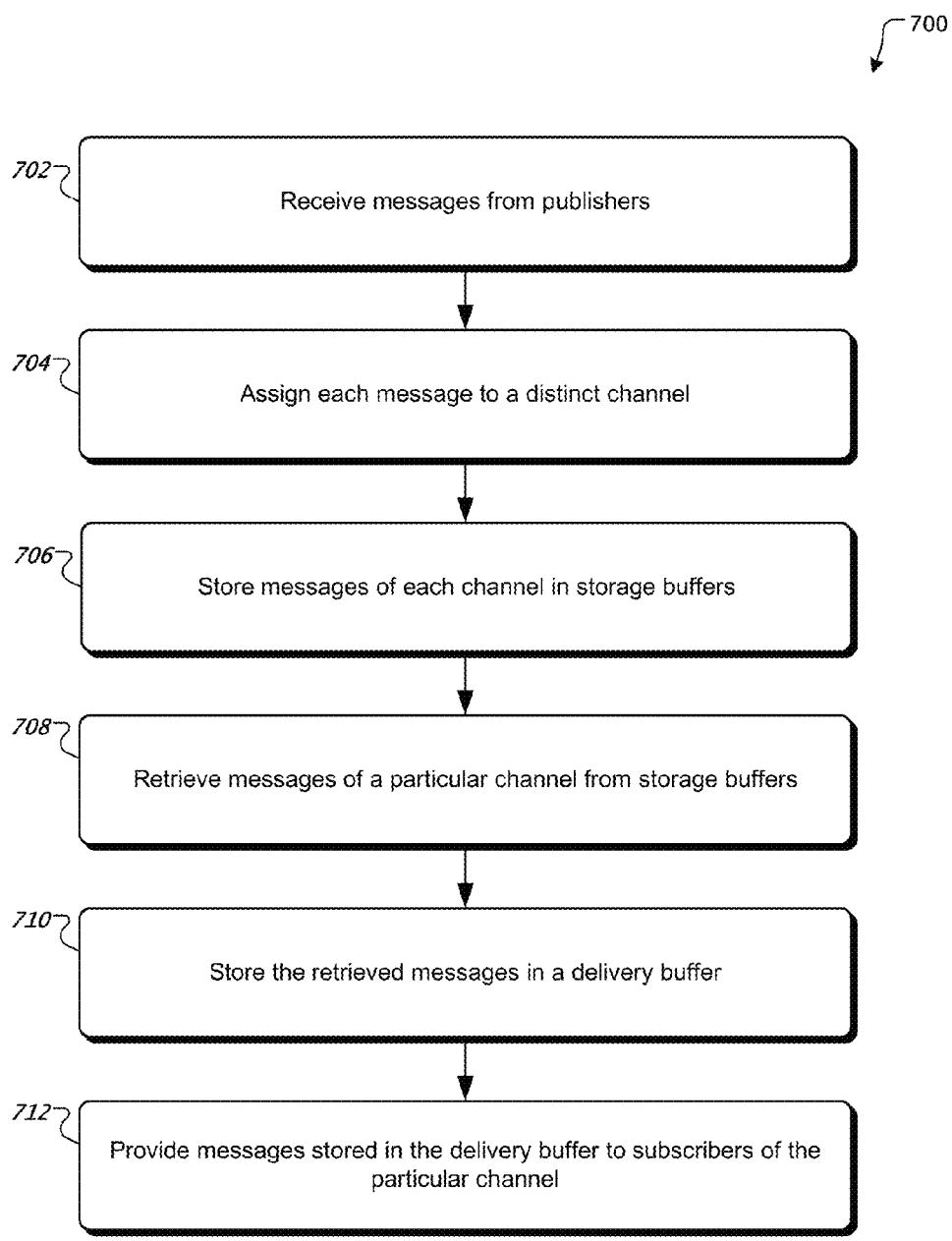
FIG. 7 is a flowchart of an example method for sending message data to a plurality of subscribers.

FIG. 7 is a flowchart of example method 700 for providing messages to a plurality of subscribers. The method includes receiving (step 702) from a plurality of publishers a plurality of messages. Each of the messages is assigned (step 704) to one of a plurality of distinct channels wherein each channel includes an ordered plurality of messages. The messages of each of the channels are stored (step 706) in one or more respective storage buffers according to the order. Each storage buffer has a respective time-to-live of a first time duration. For a particular channel, messages of the particular channel are retrieved (step 708) from respective storage buffers (e.g., those having times-to-live that have not expired and according to the order). The retrieved messages of the particular channel are stored (step 710) in a delivery buffer according to the order. The delivery buffer includes one or more data blocks, and each data block has a respective time-to-live of a second time duration (e.g., that is longer than the first time duration). The messages stored in the delivery buffer are provided (step 712) to a plurality of subscribers of the particular channel.

Examples of the systems and methods described are able to send a stream of data from one source (e.g., an ERLANG process) to multiple destinations (e.g., ERLANG processes). The stream of data is delivered at a high rate (e.g., in messages per second) and with low latency (e.g., 99% of messages are delivered with a latency less than 50 ms).

A first alternative approach involves sending messages sequentially from a sender process to all the destination processes, which may be represented as a list or other data structure. This process is generally slow and measured to be a bottleneck, for example, because locking on multicore processing can create a contention point around sending a message to processes running on other cores. The process also requires a lot of memory because every sending operation creates a copy of data to be sent (or a copy of reference to the data). The copy typically resides in the destination process message queue until the destination process handles the data. Using multiple senders does not solve the problem.

A second alternative approach is to use a table storage (e.g., an ERLANG ETS) as an intermediary single-copy storage of the stream data and let every destination process read the data from various places at the same time. This approach is also slow, however, because access to the table storage presents a bottleneck. For example, ERLANG ETS tables utilize a set of locks to protect ranges of keys from multiple accesses and order these accesses. There is also a step of determining a location for data in the ETS table, given that every call to the ETS table is done with an ETS table identifier. Both of these locks are expensive and make it difficult to exceed 10 million updates per second to a table, no matter how many keys and cores (on modern hardware) are used. If locks are eliminated, the number of accesses or processing tasks can be reduced by several orders of magnitude.

A series of tests were performed to compare these first and second alternative approaches with the fast buffer approach described herein. The tests involved using all three approaches to send 100 byte messages from one publisher to multiple receivers on a 32-core server. The number of receivers was selected from 100, 1,000, or 10,000. The results of the tests are presented in Table 1, below, which includes the resulting number of messages per second each approach was able to send.

TABLE 1

Comparison of Fast Buffer approach with two alternative approaches.

| Approach | 1 Publisher to 100 Subscribers | | 1 Publisher to 1,000 Subscribers | | 1 Publisher to 10,000 Subscribers | |
| --- | --- | --- | --- | --- | --- | --- |
| | Published Rate (msgs/sec) | Received Rate (msgs/sec) | Published Rate (msgs/sec) | Received Rate (msgs/sec) | Published Rate (msgs/sec) | Received Rate (msgs/sec) |
| First Alternative Approach - Publisher sends messages to subscribers | 400 k | 400 k | 380 k | 380 k | 350 k | 350 k |
| Second Alternative Approach - Publisher writes messages to ETS, subscribers read messages from ETS | 5000 | 0.5 m | 2200 | 2.2 m | 1280 | 5 m |

TABLE 1-continued

Comparison of Fast Buffer approach with two alternative approaches.

| Approach | 1 Publisher to 100 Subscribers | | 1 Publisher to 1,000 Subscribers | | 1 Publisher to 10,000 Subscribers | |
|---|---|---|---|---|---|---|
| | Published Rate (msgs/sec) | Received Rate (msgs/sec) | Published Rate (msgs/sec) | Received Rate (msgs/sec) | Published Rate (msgs/sec) | Received Rate (msgs/sec) |
| Fast Buffer (FB) Approach - Publisher writes messages to FB, subscribers read messages from FB | 160 k | 16 m | 160 k | 160 m | 83 k | 830 m |

In various implementations, rather than sending message data to multiple processes from a single process, the fast buffer approach described herein tasks the receivers or subscribers themselves to grab data from a single shared structure (i.e., a fast buffer). To avoid having locking issues around the shared structure, the process utilizes a "lock-free" or non-blocking approach. Receivers are able to grab many pieces of data without blocking or figuring out where to read from and up to which point. As the results in Table 1 indicate, the rates of message transfer are improved considerably when compared to the alternative approaches.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving a plurality of messages from a plurality of publishers;
   assigning each of the messages to one of a plurality of channels, wherein each channel comprises an ordered plurality of messages;
   storing messages of each of the channels in one or more respective storage buffers according to the order, wherein each storage buffer comprises a respective time-to-live of a first time duration;
   for a particular channel, retrieving messages of the particular channel from respective storage buffers;
   storing the retrieved messages of the particular channel in a delivery buffer according to the order, the delivery buffer comprising one or more data blocks, wherein each data block comprises a respective time-to-live of a second time duration; and
   providing the messages stored in the delivery buffer to a plurality of subscribers of the particular channel.

2. The method of claim 1, wherein providing the messages stored in the delivery buffer to the plurality of subscribers of the particular channel further comprises:
   determining a connection status of a particular subscriber; and
   based thereon, providing one or more of the messages stored in the delivery buffer to the particular subscriber.

3. The method of claim 1, wherein storing the retrieved messages of the particular channel in the delivery buffer comprises:
storing retrieved messages of the particular channel earlier in the order in data blocks having times-to-live that will expire sooner than data blocks used to store retrieved messages of the particular channel later in the order.

4. The method of claim 1, wherein the delivery buffer comprises a linked list of the data blocks, wherein retrieved messages last in the order of the particular channel are stored in a tail data block of the linked list.

5. The method of claim 1, wherein:
the delivery buffer resides on a first computing node; and
the messages stored in the delivery buffer are provided to each of the plurality of subscribers through a respective computing process residing on the first computing node.

6. The method of claim 1, wherein the delivery buffer comprises a visible area and an invisible area.

7. The method of claim 2, further comprising:
determining that the particular subscriber has a pre-existing connection to the particular channel; and
based thereon, providing to the particular subscriber one or more messages stored in the delivery buffer including messages stored in one or more data blocks having respective times-to-live that have expired.

8. The method of claim 2, further comprising:
determining that the particular subscriber has a new connection to the particular channel, and, based thereon;
(i) providing to the particular subscriber one or more messages stored in one or more of the data blocks having respective times-to-live that have not expired; and
(ii) preventing the particular subscriber from receiving one or more messages stored in one or more data blocks having respective times-to-live that have expired.

9. The method of claim 4, wherein storing the retrieved messages of the particular channel in the delivery buffer further comprises:
removing from the linked list one or more data blocks at a head of the linked list, wherein the removed data blocks comprise respective times-to-live that have expired.

10. The method of claim 5, wherein the storage buffers reside on respective second computing nodes that are different from the first computing node.

11. The method of claim 6, wherein a subscriber with a pre-existing connection is permitted to access data from both the visible area and the invisible area.

12. The method of claim 6, wherein a subscriber with a new connection is permitted to access data from the visible area and not permitted to access data from the invisible area.

13. A system, comprising:
one or more computers programmed to perform operations comprising:
receiving a plurality of messages from a plurality of publishers;
assigning each of the messages to one of a plurality of channels, wherein each channel comprises an ordered plurality of messages;
storing messages of each of the channels in one or more respective storage buffers according to the order, wherein each storage buffer comprises a respective time-to-live of a first time duration;
for a particular channel, retrieving messages of the particular channel from respective storage buffers;
storing the retrieved messages of the particular channel in a delivery buffer according to the order, the delivery buffer comprising one or more data blocks, wherein each data block comprises a respective time-to-live of a second time duration; and
providing the messages stored in the delivery buffer to a plurality of subscribers of the particular channel.

14. The system of claim 13, wherein providing the messages stored in the delivery buffer to the plurality of subscribers of the particular channel further comprises:
determining a connection status of a particular subscriber; and
based thereon, providing one or more of the messages stored in the delivery buffer to the particular subscriber.

15. The system of claim 13, wherein storing the retrieved messages of the particular channel in the delivery buffer comprises:
storing retrieved messages of the particular channel earlier in the order in data blocks having times-to-live that will expire sooner than data blocks used to store retrieved messages of the particular channel later in the order.

16. The system of claim 13, wherein the delivery buffer comprises a linked list of the data blocks, wherein retrieved messages last in the order of the particular channel are stored in a tail data block of the linked list.

17. The system of claim 16, wherein storing the retrieved messages of the particular channel in the delivery buffer further comprises:
removing from the linked list one or more data blocks at a head of the linked list, wherein the removed data blocks comprise respective times-to-live that have expired.

18. The system of claim 14, further comprising:
determining that the particular subscriber has a pre-existing connection to the particular channel; and
based thereon, providing to the particular subscriber one or more messages stored in the delivery buffer including messages stored in one or more data blocks having respective times-to-live that have expired.

19. The system of claim 14, further comprising:
determining that the particular subscriber has a new connection to the particular channel, and, based thereon:
(i) providing to the particular subscriber one or more messages stored in one or more of the data blocks having respective times-to-live that have not expired; and
(ii) preventing the particular subscriber from receiving one or more messages stored in one or more data blocks having respective times-to-live that have expired.

20. A non-transitory computer-readable storage device having instructions stored thereon that, when executed by one or more computers, cause the computers to perform operations comprising:
receiving a plurality of messages from a plurality of publishers;
assigning each of the messages to one of a plurality of channels, wherein each channel comprises an ordered plurality of messages;
storing messages of each of the channels in one or more respective storage buffers according to the order, wherein each storage buffer comprises a respective time-to-live of a first time duration;

for a particular channel, retrieving messages of the particular channel from respective storage buffers;

storing the retrieved messages of the particular channel in a delivery buffer according to the order, the delivery buffer comprising one or more data blocks, wherein each data block comprises a respective time-to-live of a second time duration; and providing the messages stored in the delivery buffer to a plurality of subscribers of the particular channel.

\* \* \* \* \*